(12) United States Patent
Tsukahara et al.

(10) Patent No.: US 10,334,694 B2
(45) Date of Patent: Jun. 25, 2019

(54) LIGHT EMISSION CONTROL CIRCUIT, LIGHT SOURCE DEVICE, AND PROJECTION TYPE VIDEO DISPLAY APPARATUS

(71) Applicant: SEIKO EPSON CORPORATION, Tokyo (JP)

(72) Inventors: Norikazu Tsukahara, Minamiminowa-Mura (JP); Atsushi Yamada, Suwa (JP); Kei Ishimaru, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/151,718

(22) Filed: Oct. 4, 2018

(65) Prior Publication Data

US 2019/0110349 A1 Apr. 11, 2019

(30) Foreign Application Priority Data

Oct. 5, 2017 (JP) .................................. 2017-194874
Jul. 10, 2018 (JP) .................................. 2018-130435

(51) Int. Cl.
*H05B 33/00* (2006.01)
*H05B 37/02* (2006.01)
*H02M 1/08* (2006.01)
*G03B 21/20* (2006.01)
*H05B 33/08* (2006.01)

(52) U.S. Cl.
CPC ..... *H05B 37/0209* (2013.01); *G03B 21/2053* (2013.01); *H02M 1/08* (2013.01); *H05B 33/0815* (2013.01)

(58) Field of Classification Search
CPC .... H03H 7/40; H03H 2001/0057; H03H 1/00; H05K 7/02
See application file for complete search history.

(56) References Cited

U.S. PATENT DOCUMENTS

2002/0158590 A1  10/2002  Saito et al.
2004/0124889 A1  7/2004  Koharagi et al.
2018/0180978 A1  6/2018  Yamada et al.

FOREIGN PATENT DOCUMENTS

JP  2009-200053 A  9/2009
JP  2015-135738 A  7/2015

*Primary Examiner* — Monica C King
(74) *Attorney, Agent, or Firm* — Oliff PLC

(57) ABSTRACT

A light emission control circuit includes a drive circuit that generates a first control signal in order to control a first switching element, and a switching control circuit that generates a second control signal in order to control a second switching element. The switching control circuit maintains the second control signal in an inactivation state in a period in which the first control signal is inactivated in a case where an ON duty ratio of the first control signal is equal to or more than a predetermined value, and maintains the second control signal in an activation state in a part of the period in which the first control signal is inactivated in a case where the ON duty ratio of the first control signal is less than the predetermined value.

13 Claims, 16 Drawing Sheets

LIGHT EMISSION CONTROL CIRCUIT, LIGHT SOURCE DEVICE, AND PROJECTION TYPE VIDEO DISPLAY APPARATUS

CROSS-REFERENCE TO RELATED APPLICATIONS

This application claims the benefit of Japanese Patent Application No. 2017-194874, filed on Oct. 5, 2017, and Japanese Patent Application No. 2018-130435, filed on Jul. 10, 2018, the entire disclosures of which are hereby incorporated herein by reference in their entireties.

BACKGROUND

1. Technical Field

The present invention relates to a light emission control circuit which controls light emission in a light source device using a light emitting element such as a laser diode or a light emitting diode. The present invention relates to a light source device using the light emission control circuit, and a projection type video display apparatus using the light source device.

2. Related Art

There are analog dimming and digital dimming as techniques of adjusting brightness in a light source device using a light emitting element such as a laser diode (LD) or a light emitting diode (LED). For example, the analog dimming is realized by controlling a switching regulator which drives a light emitting element, and adjusting the magnetic of a current flowing through the light emitting element. On the other hand, the digital dimming is realized by controlling turning-on and off of a switching transistor connected in series to a light emitting element, and adjusting a length of a period in which a current flows through the light emitting element.

As the related art, JP-A-2015-135738 discloses a light source drive device capable of making a relationship between the magnitude of a dimming instruction signal and an output current linear over a wider dimming region, in order to improve such dimming characteristics that a relationship between a dimming instruction and the extent of dimming greatly differs between a dimming region in which a light source is relatively bright and a dimming region in which the light source is relatively dark.

As illustrated in FIG. 2 of JP-A-2015-135738, in the light source drive device, analog dimming is used in which a converter circuit 3 including an inductor L1 and a switch element Q1 connected in series to an LED module 12 is controlled, and the magnitude of an output current Io which is supplied from the converter circuit 3 to the LED module 12 is adjusted.

JP-A-2009-200053 discloses a light source device directed to improving power efficiency in an LED lamp device. As illustrated in FIG. 3 of JP-A-2009-200053, in the light source device, digital dimming is used in which a switching element 316 connected in series to an LED lamp 106 is controlled to be turned on and off at a predetermined frequency, and a length of a period in which a current flows through the LED lamp 106 is adjusted.

In a case where both of the analog dimming and the digital dimming are used in a single light source device, if the circuit for analog dimming disclosed in JP-A-2015-135738 and the circuit for digital dimming disclosed in JP-A-2009-200053 are combined with each other, the respective circuits are individually and separately operated. Therefore, there is a case where, even after a first switching element (the switching element 316 in JP-A-2009-200053) for digital dimming transitions from an ON state to an OFF state, a second switching element (the switch element Q1 in JP-A-2015-135738) for analog dimming performs ON and OFF operations.

In a period in which the first switching element is in an OFF state, a current does not flow to a light emitting element, but, in a case where the second switching element is brought into an ON state, a current flows to a negative terminal of a DC power source from an inductor (the inductor L1 in JP-A-2015-135738) via the second switching element. Therefore, energy accumulated in the inductor is released without being used for light emission in the light emitting element. As a result, there is a problem in that a wasteful power loss occurs in a projection type video display apparatus using such a light source device.

On the other hand, the second switching element may be maintained in an OFF state in a period in which the first switching element is in an OFF state, but, in this case, there is concern that an ON period of the second switching element may be shorter than an originally necessary ON period. This causes a problem in a case where an ON period of the first switching element is shorter than an originally necessary ON period of the second switching element (for example, a case where an ON duty ratio of the first switching element is less than 5%).

In this case, since sufficient energy is not accumulated in the inductor, and energy accumulated in the inductor is gradually reduced in an OFF period of the second switching element, a current to the light emitting element is lower than a current for which an instruction is given in the analog dimming, and thus brightness of the light emitting element is insufficient.

Particularly, in a case where a laser diode is used as a light emitting element, a current flowing through the laser diode does not reach a critical current for laser oscillation, and thus there is concern that the laser diode may not emit light. There is concern that luminance of an image projected by a projection type video display apparatus using such a light source device may not be sufficient.

SUMMARY

A first advantage of some aspects of the invention is to provide a light emission control circuit which can reduce a power loss by suppressing energy accumulated in an inductor from being released without being used for light emission in a case where both of analog dimming and digital dimming are performed. A second advantage of some aspects of the invention is to prevent a current flowing through a light emitting element from being smaller than a current for which an instruction is given in analog dimming in a period in which a first switching element is in an ON state even in a case where a period of a current flowing through the light emitting element is short in digital dimming when such light emission control is performed. A third advantage of some aspects of the invention is to provide a light source device using the light emission control circuit and a projection type video display apparatus using the light source device.

A light emission control circuit according to a first aspect of the invention controls a first switching element controlling a current flowing through a light emitting element connected between a first node and one end of an inductor and a second switching element controlling a current flowing from the other end of the inductor toward a second node, and the light emission control circuit includes a drive circuit that activates or inactivates a first control signal in order to bring the first switching element into an ON state or an OFF state; and a switching control circuit that brings the second switching element into an ON state or an OFF state by activating or inactivating a second control signal in a period in which the first control signal is activated, in which the switching control circuit maintains the second control signal in an inactivation state in a period in which the first control signal is inactivated in a case where an ON duty ratio of the first control signal is equal to or more than a predetermined value, and maintains the second control signal in an activation state in a part of the period in which the first control signal is inactivated in a case where the ON duty ratio of the first control signal is less than the predetermined value.

According to the first aspect of the invention, in a case where the ON duty ratio of the first control signal for digital dimming is equal to or more than the predetermined value, the second control signal for analog dimming is maintained in an inactivation state in a period in which the first control signal is inactivated, and thus the second switching element is maintained in an OFF state. Consequently, in a case where both of analog dimming and digital dimming are performed, it is possible to prevent energy accumulated in the inductor from being released without being used for light emission, and thus to reduce a power loss.

In a case where an ON duty ratio of the first control signal for digital dimming is less than the predetermined value, the second control signal for analog dimming is maintained in an activation state in a part of the period in which the first control signal is inactivated, and thus the second switching element is maintained in an ON state. Consequently, even in a case where a period in which a current flows through the light emitting element is short in digital dimming, energy can be replenished in the inductor, and thus it is possible to prevent a current flowing through the light emitting element from being lower than a current for which an instruction is given in analog dimming.

Here, the switching control circuit may maintain the second control signal in an activation state in a predetermined period after the first control signal transitions from an activation state to an inactivation state in a case where the ON duty ratio of the first control signal is less than the predetermined value. Consequently, a period in which the second switching element is in an ON state can be extended by a predetermined period after the first control signal is inactivated, and thus energy replenished in the inductor can be consecutively increased.

In a case where the ON duty ratio of the first control signal is less than the predetermined value, and the second control signal is not inactivated even once in a period in which the first control signal is activated, the switching control circuit may maintain the second control signal in an activation state in the predetermined period. With this configuration, a pulse width of the second control signal can be extended only in a case where the second control signal is activated as a single pulse in a period in which the first control signal is activated.

The switching control circuit may set the predetermined period to a first period in a case where the ON duty ratio of the first control signal is a first value, and may set the predetermined period to a second period longer than the first period in a case where the ON duty ratio of the first control signal is a second value smaller than the first value. With this configuration, in a case where a period is short in which a current flows through the light emitting element in digital dimming, it is possible to further increase energy replenished in the inductor.

Alternatively, the switching control circuit may adjust the predetermined period according to a current flowing through the light emitting element. With this configuration, in a case where a current flowing through the light emitting element is smaller, it is possible to further increase energy replenished in the inductor.

In a case where the ON duty ratio of the first control signal is less than the predetermined value, the switching control circuit may extend, by a first period, a period in which the second control signal is maintained in an activation state after the first control signal transitions from an activation state to an inactivation state in a case where a current flowing through the light emitting element is less than the predetermined value when the first control signal is activated, and may reduce, by a second period, a period in which the second control signal is maintained in an activation state after the first control signal transitions from an activation state to an inactivation state in a case where a current flowing through the light emitting element is more than the predetermined value when the first control signal is activated.

In this case, the second period is preferably longer than the first period. For example, in a case where an ON duty ratio of the first control signal changes from a first value to a second value greater than the first value, if the second control signal is generated according to an extension period which is set when an ON duty ratio is the first value, a current flowing through the light emitting element is excessive. Therefore, in a case where an extension period is set next, the extension period is reduced by the second period longer than the first period, and thus it is possible to remove an excessive current early.

In the above configuration, the light emission control circuit may receive information regarding the ON duty ratio of the first control signal from the outside. Consequently, the switching control circuit may adjust an inactivation timing of the second control signal on the basis of the information regarding an ON duty ratio of the first control signal.

A light emission control circuit according to a second aspect of the invention controls a first switching element controlling a current flowing through a light emitting element connected between a first node and one end of an inductor and a second switching element controlling a current flowing from the other end of the inductor toward a second node, and the light emission control circuit includes a drive circuit that activates or inactivates a first control signal in order to bring the first switching element into an ON state or an OFF state; and a switching control circuit that activates or inactivates a second control signal in order to bring the second switching element into an ON state or an OFF state by in a period in which the first control signal is activated, reduces a period in which activation of the second control signal is prohibited within a period in which the first control signal is inactivated in a case where a current flowing through the light emitting element is less than a predetermined value when the first control signal is activated, and extends the period in which activation of the second control signal is prohibited within the period in which the first control signal is inactivated in a case where the current flowing through the light emitting element is more than the predetermined value when the first control signal is activated.

According to the second aspect of the invention, in a case where a current flowing through the light emitting element is less than a predetermined value when the first control signal for digital dimming is activated, a period in which activation of the second control signal for analog dimming is prohibited is reduced within a period in which the first control signal is inactivated. Consequently, even in a case where a period in which a current flows through the light emitting element is short in digital dimming, energy can be replenished in the inductor, and thus it is possible to prevent a current flowing through the light emitting element from being lower than a current for which an instruction is given in analog dimming.

In a case where a current flowing through the light emitting element is more than a predetermined value when the first control signal for digital dimming is activated, a period in which activation of the second control signal for analog dimming is prohibited is extended within a period in which the first control signal is inactivated. With this configuration, in a case where both of analog dimming and digital dimming are performed, it is possible to prevent energy accumulated in the inductor from being released without being used for light emission, and thus to reduce a power loss.

The light emission control circuit according to the first or second aspect of the invention may further include a sample-hold circuit that samples and holds a voltage which is proportional to a current flowing through the light emitting element when the first control signal is activated, in a case where an inactivation timing of the second control signal is adjusted on the basis of a current flowing through the light emitting element. In a case where an ON duty ratio of the first control signal is reduced, a period in which a current flows through the light emitting element is short, but the sample-hold circuit has an operation speed higher than that of an operational amplifier, and can thus measure a current flowing through the light emitting element with high accuracy.

A light source device according to a third aspect of the invention includes any of the light emission control circuits described above; the light emitting element, the inductor, and the first and second switching elements; a capacitor that is connected between one end of the inductor and the first node; and a diode that is connected between the other end of the inductor and the first node, in which, when the first and second switching elements are in an ON state, currents flow through the light emitting element and the inductor such that energy is accumulated in the inductor; when the first switching element is in an ON state, and the second switching element is in an OFF state, currents flow through the light emitting element and the diode due to the energy accumulated in the inductor; and when the first switching element is in an OFF state, and the second switching element is in an ON state, currents flow through the capacitor and the inductor such that energy is accumulated in the inductor.

According to the third aspect of the invention, the light emission control circuit can prevent energy accumulated in the inductor from being released without being used for light emission, and can also prevent a reduction in a current flowing through the light emitting element even in a case where a period is short in which a current flows through the light emitting element in digital dimming, so that it is possible to provide a light source device which is small in power loss and can accurately control brightness.

A projection type video display apparatus according to a fourth aspect of the invention includes the light source device according to the third aspect of the invention. According to the fourth aspect of the invention, it is possible to reduce power consumption of the projection type video display apparatus and to accurately control luminance of a projected image by using the light source device which is small in power loss and can accurately control brightness.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
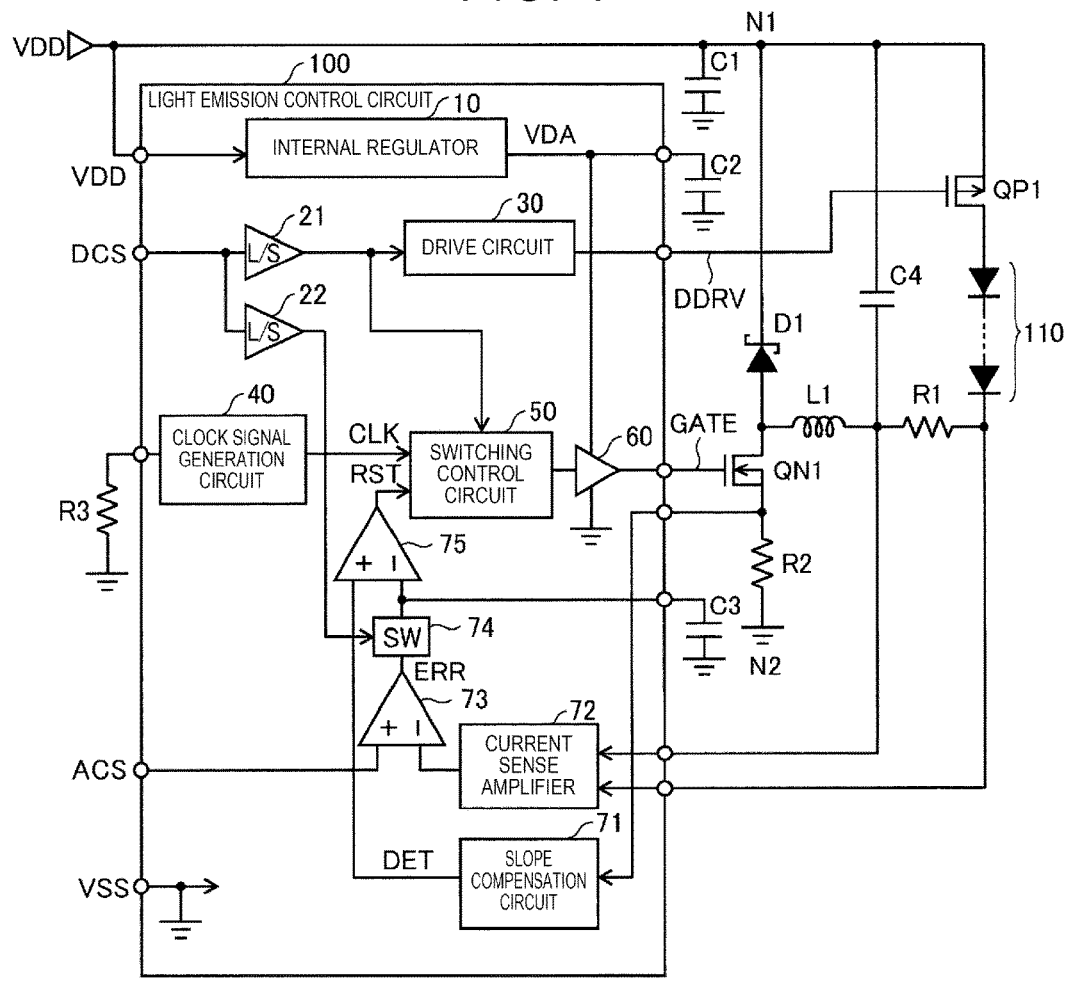
FIG. 1 is a circuit diagram illustrating a light source device including a light emission control circuit according to a first embodiment of the invention.

Hereinafter, embodiments of the invention will be described in detail with reference to the drawings. The same constituent element is given the same reference numeral, and repeated description will be omitted.

First Embodiment

FIG. 1 is a circuit diagram illustrating a configuration example of a light source device including a light emission control circuit according to a first embodiment of the invention. As illustrated in FIG. 1, the light source device includes a light emission control circuit 100, a light emitting element 110, an inductor L1, a P-channel MOS transistor QP1 which is a first switching element, an N-channel MOS transistor QN1 which is a second switching element, a diode D1, resistors R1 to R3, and capacitors C1 to C4.

A power source potential VDD on a high potential side is supplied to a first node N1 of the light source device, and a power source potential VSS on a low potential side is supplied to a second node N2. FIG. 1 illustrates a case where the power source potential VSS is a ground potential (0 V). The transistor QP1, the light emitting element 110, the resistor R1, the inductor L1, the transistor QN1, and the resistor R2 are connected in series to each other between the first node N1 and the second node N2. The light emitting element 110 includes, for example, at least one laser diode (LD) or a light emitting diode (LED), and emits light with brightness corresponding to the magnitude of a supplied current.

The transistor QP1 may be connected between the light emitting element 110 and the resistor R1 or between the resistor R1 and the inductor L1, but, in the example illustrated in FIG. 1, the transistor QP1 is connected between the first node N1 and the light emitting element 110. The transistor QP1 has a source connected to the first node N1, a drain connected to the light emitting element 110, and a gate to which a first control signal DDRV is applied.

The transistor QP1 is provided for digital dimming, and controls a current flowing through the light emitting element 110 which is connected between the first node N1 and one end of the inductor L1. The transistor QP1 is brought into an ON state when the first control signal DDRV is activated to a low level, and is brought into an OFF state when the first control signal DDRV is inactivated to a high level. In a case where the first control signal DDRV is alternately activated and inactivated, the transistor QP1 performs a switching operation.

The resistor R1 is connected between the light emitting element 110 and one end of the inductor L1, has a small resistance value of, for example, about 50 mΩ, and is used to detect a current flowing through the transistor QP1 and the light emitting element 110. The transistor QN1 has a drain connected to the other end of the inductor L1, a source connected to the second node N2 via the resistor R2, and a gate to which a second control signal GATE is applied.

The transistor QN1 is provided for analog dimming, and controls a current which flows from the other end of the inductor L1 toward the second node N2. The transistor QN1 is brought into an ON state when the second control signal GATE is activated to a high level, and is brought into an OFF state when the second control signal GATE is inactivated to a low level. In a case where the second control signal GATE is alternately activated and inactivated, the transistor QN1 performs a switching operation.

The resistor R2 is connected between the source of the transistor QN1 and the second node N2, has a small resistance value of, for example, about 100 mΩ, and is used to detect a current flowing through the transistor QN1. As a switching element, other than the MOS transistor, a bipolar transistor, an insulated gate bipolar transistor (IGBT), a thyristor, or the like may be used.

The diode D1 is connected between the other end of the inductor L1 and the first node N1, and has an anode connected to the other end of the inductor L1 and a cathode connected to the first node N1. For example, a Schottky barrier diode of which a forward voltage is lower than that of a PN junction diode, and thus a switching is high, is used as the diode D1.

The capacitor C1 is connected between the first node N1 and the second node N2, and smooths a power source voltage (VDD-VSS). The capacitor C4 is connected between one end of the inductor L1 and the first node N1, and smooths a step-down voltage obtained by stepping down the power source voltage (VDD-VSS).

Light Emission Control Circuit

The light emission control circuit 100 is supplied with a digital dimming signal DCS and an analog dimming signal ACS from an external microcomputer or the like, and controls the transistors QP1 and QN1 of the light source device. FIG. 1 illustrates an example in which the light emission control circuit 100 is built into a single semiconductor device (IC), but the light emission control circuit 100 may be configured with a plurality of discrete components or ICs. The diode D1, the resistor R1, or the resistor R2 may be built into an IC.

As illustrated in FIG. 1, the light emission control circuit 100 includes an internal regulator 10, level shifters 21 and 22, a drive circuit 30, a clock signal generation circuit 40, a switching control circuit 50, a drive circuit 60, and a slope compensation circuit 71 to a comparator 75 provided in a feedback loop of the switching control circuit 50.

The internal regulator 10 includes, for example, a reference voltage generation circuit configured with a bandgap reference circuit or the like, and generates an internal power source potential VDA which is to be supplied to an internal circuit of the IC on the basis of the power source potential VDD. The capacitor C2 is connected between an output terminal of the internal regulator 10 and the second node N2, and smooths an internal power source voltage (VDA-VSS). The level shifters (L/S) 21 and 22 shift a high level potential of the digital dimming signal DCS to a potential suitable for the internal circuit of the IC.

The drive circuit 30 generates the first control signal DDRV for controlling the transistor QP1 on the basis of the digital dimming signal DCS supplied from the level shifter 21. For example, the drive circuit 30 generates an inversion signal by inverting the digital dimming signal DCS, and makes a high level potential of the inversion signal substantially the same as the power source potential VDD so as to generate the first control signal DDRV.

In this case, when the digital dimming signal DCS is activated to a high level, the transistor QP1 is brought into an ON state, and thus a current flows through the light emitting element 110. Therefore, a period in which a current flows through the light emitting element 110 is changed by changing a duty ratio of the digital dimming signal DCS, and thus digital dimming can be performed.

The clock signal generation circuit 40 includes, for example, a CR oscillation circuit, and generates a clock signal CLK having a predetermined frequency by performing an oscillation operation. An oscillation frequency of the CR oscillation circuit is defined by a time constant which is a product between a capacitance value of a capacitor and a resistance value of a resistor. The resistor R3 is externally attached to the IC in order to adjust an oscillation frequency of the CR oscillation circuit.

The switching control circuit 50 generates the second control signal GATE for controlling the transistor QN1 on the basis of the clock signal CLK, a reset signal RST, and the digital dimming signal DCS supplied from the level shifter 21. The second control signal GATE is applied to the gate of the transistor QN1 via the drive circuit 60 configured with a driver amplifier and the like. A power source potential supplied to the drive circuit 60 may be the internal power source potential VDA, and may be another power source potential which is higher than the internal power source potential VDA.

When the transistors QP1 and QN1 are in an ON state, a current flows from the first node N1 toward the second node N2 via the light emitting element 110, the inductor L1, and the like, and electric energy is converted into magnetic energy to be accumulated in the inductor L1. When the transistor QP1 is in an ON state, and the transistor QN1 is in an OFF state, the magnetic energy accumulated in the inductor L1 is released as electric energy, and thus a current flows through the light emitting element 110, the diode D1, and the like. In a case where the transistor QP1 is an in OFF state, and the transistor QN1 is in an ON state, a current flows through the capacitor C4, the inductor L1, and the like, and thus energy is accumulated in the inductor L1.

The slope compensation circuit 71 adds a bias voltage to a voltage between both ends of the resistor R2 for current detection, so as to generate a detection signal DET, and supplies the detection signal DET to a noninverting input terminal of the comparator 75. A current sense amplifier 72 amplifies a voltage between both ends of the resistor R1 for current detection so as to generate an output signal, and supplies the output signal to an inverting input terminal of an operational amplifier 73.

The analog dimming signal ACS is supplied to a noninverting input terminal of the operational amplifier 73. The operational amplifier 73 amplifies a difference between a voltage of the analog dimming signal ACS and a voltage of the output signal from the current sense amplifier 72 so as to generate an error signal ERR, and supplies the error signal ERR to a switch circuit (SW) 74.

The switch circuit 74 is configured with, for example, an analog switch, and is brought into an ON state when the digital dimming signal DCS supplied from the level shifter 22 is activated, and is brought into an OFF state when the digital dimming signal DCS is inactivated. Consequently, a voltage of the error signal ERR generated when the transistor QP1 is in an ON state is held in the capacitor C3, and is supplied to an inverting input terminal of the comparator 75.

The comparator 75 compares a voltage of the detection signal DET supplied from the slope compensation circuit 71 with a voltage of the error signal ERR so as to generate the reset signal RST corresponding to a comparison result, and supplies the reset signal RST to the switching control circuit 50.

When the digital dimming signal DCS is activated to a high level, and thus the transistor QP1 is brought into an ON state, the switching control circuit 50 activates the second control signal GATE to a high level in synchronized with rising of the clock signal CLK. Consequently, the transistor QN1 is brought into an ON state, and thus a current flows from the first node N1 toward the resistor R2 for current detection via the light emitting element 110, the inductor L1, and the like.

A current flowing through the inductor L1 gradually increases over time. As a current flowing through the resistor R2 via the inductor L1 and the like increases, a voltage of the detection signal DET also increases. In a case where the voltage of the detection signal DET exceeds the voltage of the error signal ERR held in the capacitor C3, the reset signal RST is activated to a high level. Consequently, the second control signal GATE is inactivated to a low level, and thus the transistor QN1 is brought into an OFF state.

In such a pulse width modulation (PWM) operation, in a case where a voltage of the analog dimming signal ACS is increased, an ON duty ratio of the second control signal GATE is increased such that a period in which the transistor QN1 is in an ON state is increased, and thus a current flowing through the light emitting element 110 is increased. Therefore, a current flowing through the light emitting element 110 is changed by changing a voltage of the analog dimming signal ACS, and thus it is possible to perform analog dimming.

On the other hand, when the transistor QP1 is in an OFF state, a current does not flow through the light emitting element 110. However, when the transistor QN1 is brought into an ON state, a current flows from the inductor L1 toward the second node N2 via the transistor QN1, and thus energy accumulated in the inductor L1 is released without being used for light emission in the light emitting element 110. As a result, there is a problem in that a wasteful power loss occurs in a projection type video display apparatus using such a light source device.

Therefore, in the present embodiment, in a case where the second control signal GATE is alternately activated and inactivated, the switching control circuit 50 inactivates the second control signal GATE in order to bring the transistor QN1 into an OFF state in a period in which the drive circuit 30 inactivates the first control signal DDRV in order to bring the transistor QP1 into an OFF state.

Figure 2:
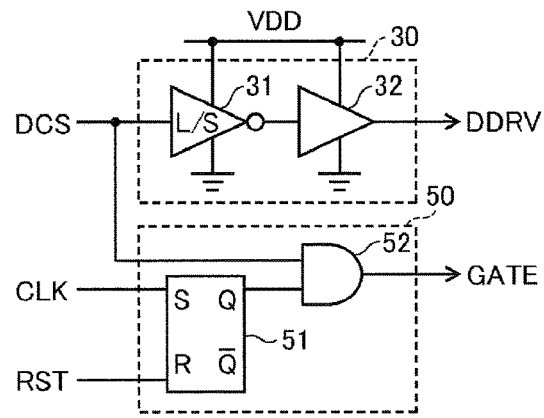
FIG. 2 is a circuit diagram illustrating a configuration example of a drive circuit and a switching control circuit illustrated in FIG. 1.

FIG. 2 is a circuit diagram illustrating a configuration example of the drive circuit and the switching control circuit illustrated in FIG. 1. As illustrated in FIG. 2, the drive circuit 30 includes a level shifter 31 and a driver amplifier 32 which are supplied with the power source potential VDD and the power source potential VSS (ground potential). The level shifter 31 inverts, for example, the digital dimming signal DCS supplied from the level shifter 21 illustrated in FIG. 1, so as to generate the first control signal DDRV. A high level potential of the first control signal DDRV is substantially the same as the power source potential VDD. The first control signal DDRV is applied to the gate of the transistor QP1 (FIG. 1) via the driver amplifier 32. The power source potential VDD and a power source potential VHB may be supplied to the level shifter 31 and the driver amplifier 32.

The switching control circuit 50 includes, for example, an RS flip-flop 51 and an AND circuit 52. The RS flip-flop 51 is set in synchronization with rising of the clock signal CLK when the reset signal RST is in a low level, and activates an output signal to a high level, and is reset in synchronization with rising of the reset signal RST when the clock signal CLK is in a low level, and inactivates an output signal to a low level.

The AND circuit 52 obtains a logical product between the digital dimming signal DCS and the output signal from the RS flip-flop 51 so as to generate the second control signal GATE. Therefore, when the digital dimming signal DCS is inactivated to a low level, the first control signal DDRV is inactivated to a high level, and the second control signal GATE is inactivated to a low level.

Operation Example

Figure 3:
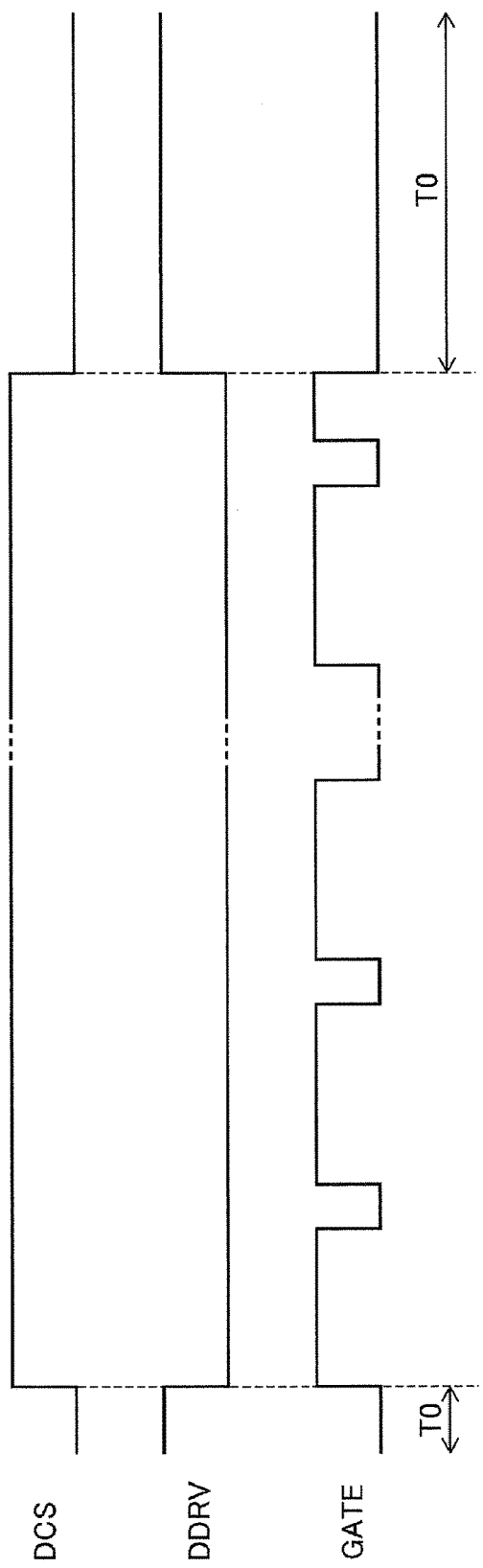
FIG. 3 is a timing chart for explaining an operation example of the light emission control circuit illustrated in FIG. 1.

FIG. 3 is a timing chart for explaining an operation example of the light emission control circuit illustrated in FIG. 1. In FIG. 3, the amplitude of a signal is normalized to be constant. In this example, the drive circuit 30 inverts the digital dimming signal DCS so as to generate the first control signal DDRV. When the first control signal DDRV is activated to a low level, the transistor QP1 is brought into an ON state, and when the first control signal DDRV is inactivated to a high level, the transistor QP1 is brought into an OFF state.

For example, the drive circuit 30 activates the first control signal DDRV at all time in a first dimming mode in which the light emitting element 110 emits light relatively brightly. On the other hand, in a second dimming mode in which the light emitting element 110 emits light relatively darkly (more darkly than in the first dimming mode), the drive circuit 30 alternately activates and inactivates the first control signal DDRV according to a duty ratio of the digital dimming signal DCS, and thus adjusts a length of a period in which a current flows through the light emitting element 110.

In the first dimming mode and the second dimming mode, the switching control circuit 50 alternately activates and inactivates the second control signal GATE according to a voltage of the analog dimming signal ACS, and thus adjusts the magnitude of a current flowing through the light emitting element 110. Consequently, only analog dimming can be performed in the first dimming mode in which the light emitting element 110 emits light relatively brightly, and, in addition to analog dimming, digital dimming can be performed in the second dimming mode in which the light emitting element 110 emits light relatively darkly.

When the second control signal GATE is activated to a high level, the transistor QN1 is brought into an ON state, and, when the second control signal GATE is inactivated to a low level, the transistor QN1 is brought into an OFF state. As illustrated in FIG. 3, the switching control circuit 50 inactivates the second control signal GATE to a low level in a period T0 in which the drive circuit 30 inactivates the first control signal DDRV to a high level.

According to the light emission control circuit 100 of the present embodiment, in a case where both of analog dimming and digital dimming are performed, the transistor QP1 for digital dimming is brought into an OFF state, and the transistor QN1 for analog dimming is maintained in an OFF state in a period in which a current does not flow through the light emitting element 110. Consequently, it is possible to prevent energy accumulated in the inductor L1 from being released without being used for light emission, and thus to reduce a power loss.

Second Embodiment

Figure 4:
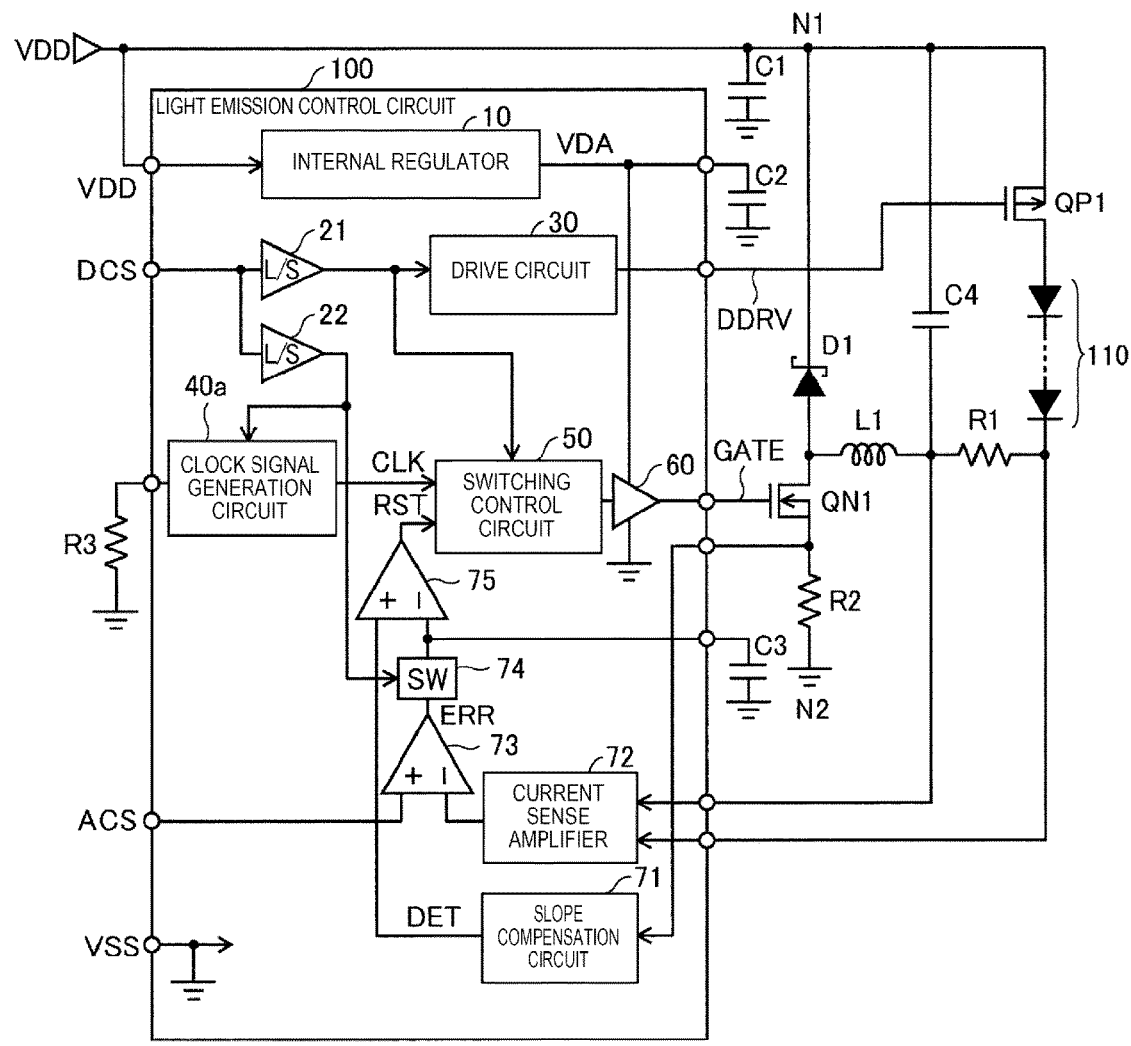
FIG. 4 is a circuit diagram illustrating a light source device including a light emission control circuit according to a second embodiment of the invention.
Figure 5:
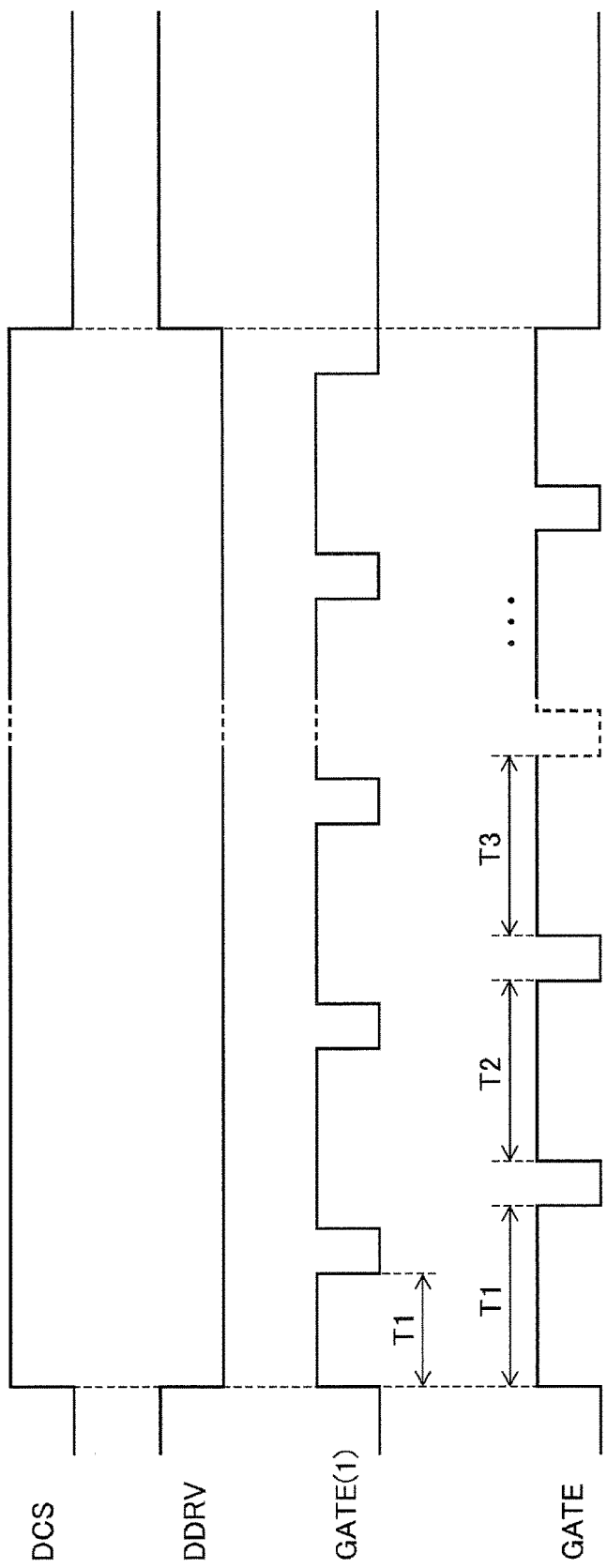
FIG. 5 is a timing chart for comparing operations of the light emission control circuits illustrated in FIGS. 1 and 4 with each other.

FIG. 4 is a circuit diagram illustrating a configuration example of a light source device including a light emission control circuit according to a second embodiment of the invention. In the second embodiment, a clock signal generation circuit 40a is used instead of the clock signal generation circuit 40 in the first embodiment illustrated in FIG. 1. The second embodiment may be the same as the first embodiment except for such a configuration. FIG. 5 is a timing chart illustrating comparison between operations of the light emission control circuits illustrated in FIGS. 1 and 4. In FIG. 5, the amplitude of a signal is normalized to be constant.

In the light emission control circuit 100 according to the first embodiment illustrated in FIG. 1, the clock signal generation circuit 40 is operated regardless of the digital dimming signal DCS. Therefore, in a case where the transistor QP1 for digital dimming performs a switching operation, and thus the light emitting element 110 intermittently emits light, a timing at which a second control signal GATE (1) is initially activated after activation of the first control signal DDRV is delayed depending on a timing at which the digital dimming signal DCS is activated. Alternatively, as illustrated in FIG. 5, an activation period T1 in which the second control signal GATE(1) is initially maintained in an activation state after activation of the first control signal DDRV is shortened.

In a case where a timing is delayed at which the transistor QN1 is initially brought into an ON state after the transistor QP1 is brought into an ON state, a light emission timing of the light emitting element 110 is delayed or a sufficient current does not flow through the light emitting element 110 in a state in which sufficient energy is not accumulated in the inductor L1. If the activation period T1 is short, the transistor QN1 transitions to an OFF state in a state in which sufficient energy is not accumulated in the inductor L1, and thus a sufficient current does not flow through the light emitting element 110. As a result, there is a case where a light emission timing or brightness of the light emitting element 110 is changed, and thus an operator of the light source device sometimes feels inconvenient. There is concern that the luminance of an image projected by a projection type video display apparatus using such a light source device changes.

Therefore, in the second embodiment, the switching control circuit 50 starts activation of the second control signal GATE in synchronization with activation of the first control signal DDRV. Consequently, in a case where the light emitting element 110 intermittently emits light through digital dimming, if the transistor QP1 is brought into an ON state, the transistor QN1 is also brought into an ON state, and thus it is possible to reduce a change of a light emission timing or brightness of the light emitting element 110. It is possible to reduce a change of luminance of an image projected by a projection type video display apparatus including such a light source device.

The switching control circuit 50 may set the activation period T1 (FIG. 5) in which the second control signal GATE is initially maintained in an activation state after activation of the first control signal DDRV to be a predetermined period or more. Here, the predetermined period is preferably within a range of 95% or less of an activation period T2 in which the second control signal GATE is maintained in an activation state for the second time after activation of the first control signal DDRV.

Consequently, in a case where the light emitting element 110 intermittently emits light through digital dimming, since the transistor QN1 is brought into an ON state such that sufficient energy is accumulated in the inductor L1, and then the transistor QN1 is brought into an OFF state, it is possible to reduce a change of brightness of the light emitting element 110. In contrast, in a case where a pulse of the second control signal GATE initially generated after the first control signal DDRV is activated is masked, the occurrence of a short pulse can be prevented, but there is a problem in that activation of the second control signal GATE is delayed.

The light emission control circuit 100 illustrated in FIG. 4 includes the clock signal generation circuit 40*a* which starts to generate the clock signal CLK in synchronization with activation of the first control signal DDRV supplied from the level shifter 22, and the switching control circuit 50 activates the second control signal GATE in synchronization with the clock signal CLK. Consequently, an activation timing of the second control signal GATE can be synchronized with an activation timing of the first control signal DDRV.

Figure 6:
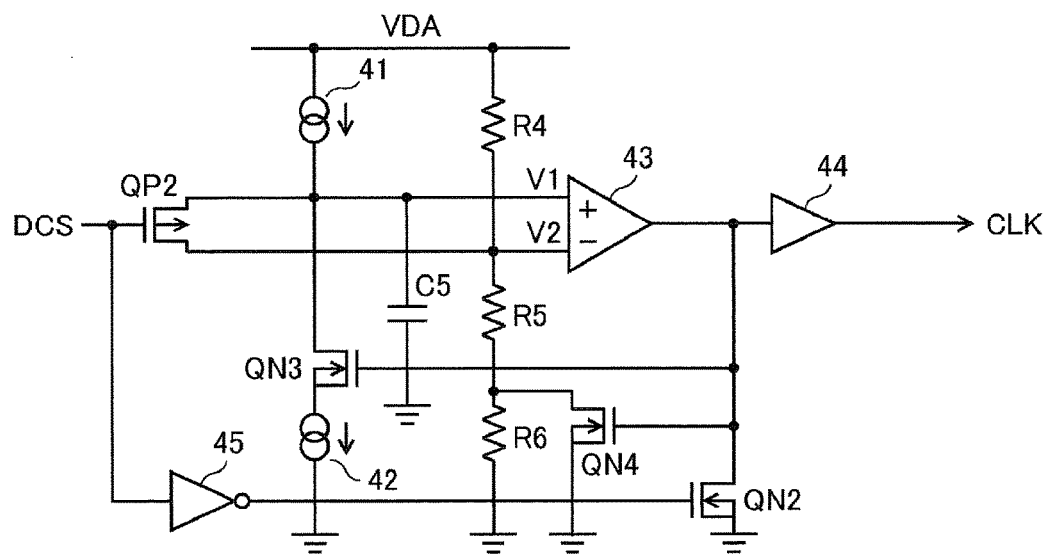
FIG. 6 is a circuit diagram illustrating a configuration example of a clock signal generation circuit illustrated in FIG. 4.
Figure 7:
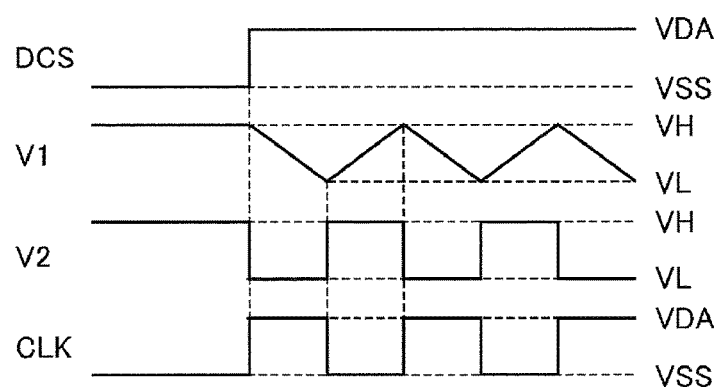
FIG. 7 is a waveform diagram illustrating waveforms at respective portions of the clock signal generation circuit illustrated in FIG. 6.

FIG. 6 is a circuit diagram illustrating a configuration example of the clock signal generation circuit illustrated in FIG. 4, and FIG. 7 is a waveform diagram illustrating waveforms at respective portions of the clock signal generation circuit illustrated in FIG. 6. The clock signal generation circuit 40*a* is operated by being supplied with the internal power source potential VDA of the IC and the power source potential VSS. In the following description, the power source potential VSS is assumed to be a ground potential (0 V).

As illustrated in FIG. 6, the clock signal generation circuit 40*a* includes constant current sources 41 and 42, a comparator 43, a buffer circuit 44, an inverter 45, a P-channel MOS transistor QP2, N-channel MOS transistors QN2 to QN4, resistors R4 to R6, and a capacitor C5.

The constant current source 41 is connected between a wire for the internal power source potential VDA of the IC and a noninverting input terminal of the comparator 43. The constant current source 42 is connected between the noninverting input terminal of the comparator 43 and a wire for the power source potential VSS via the transistor QN3. For example, the constant current sources 41 and 42 are respectively configured with a P-channel MOS transistor and an N-channel MOS transistor in each of which a predetermined bias voltage is applied between a gate and a source thereof and supplies a constant current.

The comparator 43 compares an input potential V1 supplied to the noninverting input terminal with an input potential V2 supplied to an inverting input terminal, and outputs the clock signal CLK corresponding to a comparison result from an output terminal. The buffer circuit 44 buffers the clock signal CLK supplied from the comparator 43, and outputs the buffered clock signal CLK. The inverter 45 inverts the digital dimming signal DCS, and outputs the inverted digital dimming signal DCS.

The transistor QP2 has a source connected to the noninverting input terminal of the comparator 43, a drain connected to the inverting input terminal of the comparator 43, and a gate to which the digital dimming signal DCS is applied. The transistor QN2 has a drain connected to the output terminal of the comparator 43, a source connected to the wire for the power source potential VSS, and a gate to which an output signal from the inverter 45 is applied.

The capacitor C5 is connected between the noninverting input terminal of the comparator 43 and the wire for the power source potential VSS. The resistor R4 is connected between the wire for the internal power source potential VDA of the IC and the noninverting input terminal of the comparator 43. The resistors R5 and R6 are connected in series between the inverting input terminal of the comparator 43 and the wire for the power source potential VSS.

The transistor QN3 has a drain connected to the noninverting input terminal of the comparator 43, a source connected to the wire for the power source potential VSS via the constant current source 42, and a gate to which an output signal from the comparator 43 is applied. The transistor QN4 has a drain connected to a contact point between the resistor R5 and the resistor R6, a source connected to the wire for the power source potential VSS, and a gate to which an output signal from the comparator 43 is applied.

When the digital dimming signal DCS is inactivated to a low level (VSS), the transistors QP2 and QN2 are in an ON state. Consequently, the clock signal CLK output from the comparator 43 has a low level, and thus the transistors QN3 and QN4 are brought into an OFF state.

Therefore, the input potentials V1 and V2 supplied to the comparator 43 are substantially the same as a division voltage VH obtained by dividing the power source potential VDA with the resistors R4 to R6.

$$VH=\{(R5+R6)/(R4+R5+R6)\}VDA \quad (1)$$

Actually, the input potentials V1 and V2 are slightly higher than the division voltage VH expressed by Equation (1) due to a current supplied from the constant current source 41. The capacitor C5 is charged to the input potential V1.

In a case where the digital dimming signal DCS is activated to a high level (VDA), the transistors QP2 and QN2 are brought into an OFF state. Consequently, the noninverting input terminal and the inverting input terminal of the comparator 43 are electrically disconnected from each other. Since the input potential V2 of the inverting input terminal of the comparator 43 is reduced to the division voltage VH expressed by Equation (1), and is lower than the input potential V1 of the noninverting input terminal of the comparator 43, the clock signal CLK output from the comparator 43 transitions to a high level, and thus the transistors QN3 and QN4 are brought into an ON state.

Therefore, electric charge accumulated in the capacitor C5 is released via the transistor QN3 and the constant current source 42, and thus the input potential V1 of the noninverting input terminal of the comparator 43 is gradually reduced toward the power source potential VSS. The input potential V2 of the inverting input terminal of the comparator 43 is immediately reduced to a division voltage VL expressed by the following Equation (2).

$$VL=\{R5/(R4+R5)\}VDA \quad (2)$$

In a case where the input potential V1 of the noninverting input terminal of the comparator 43 is lower than the division voltage VL, the clock signal CLK output from the comparator 43 transitions to a low level, and thus the transistors QN3 and QN4 are brought into an OFF state. Therefore, the capacitor C5 is charged by a current supplied from the constant current source 41, and thus the input potential V1 of the noninverting input terminal of the comparator 43 gradually increases toward the internal power source potential VDA of the IC. The input potential V2 of the inverting input terminal of the comparator 43 immediately increases to the division voltage VH expressed by Equation (1).

In a case where the input potential V1 of the noninverting input terminal of the comparator 43 is higher than the division voltage VH, the clock signal CLK output from the comparator 43 transitions to a high level. The operation is repeatedly performed, and thus the clock signal generation circuit 40*a* generates the clock signal CLK having a predetermined frequency.

Third Embodiment

Figure 8:
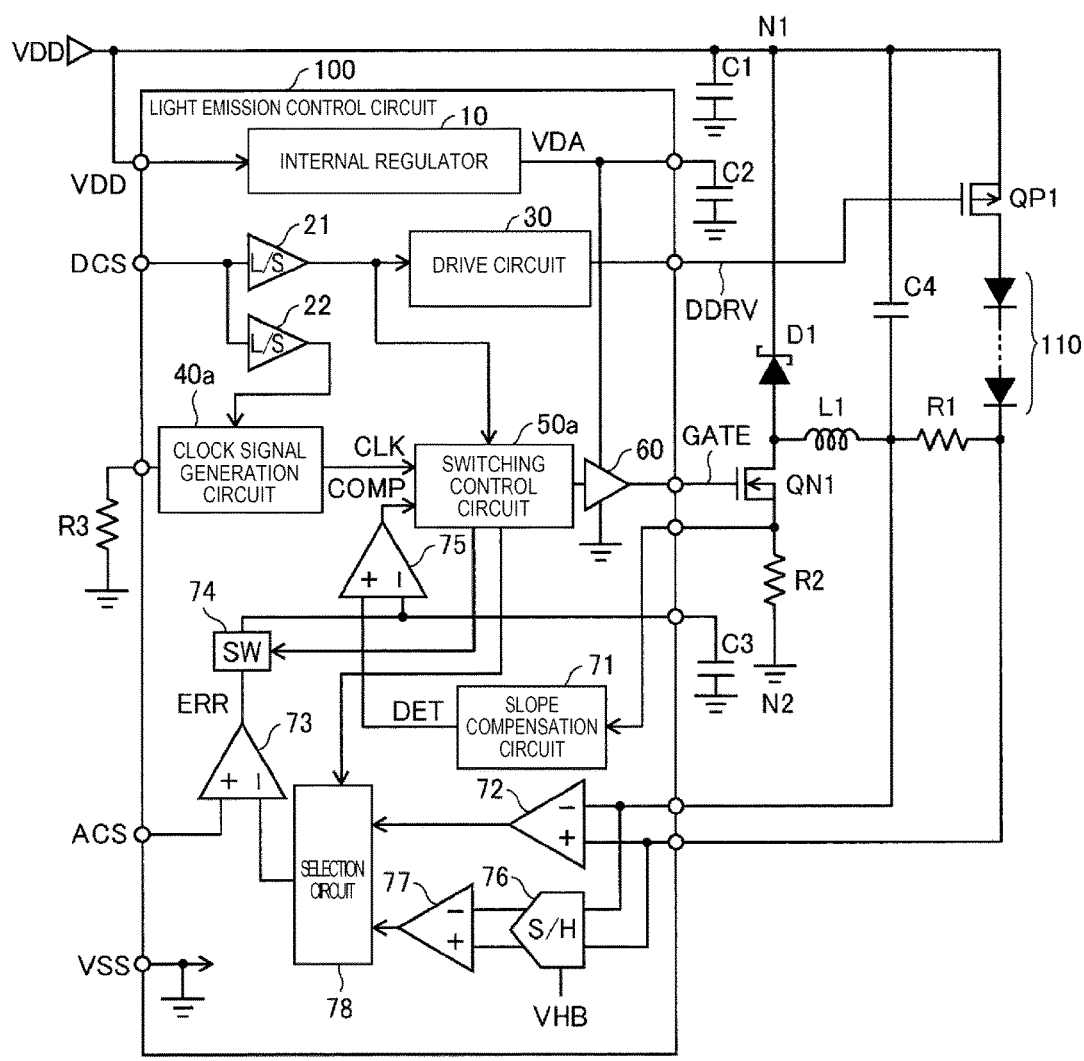
FIG. 8 is a circuit diagram illustrating a light source device including a light emission control circuit according to a third embodiment of the invention.

FIG. 8 is a circuit diagram illustrating a configuration example of a light source device including a light emission control circuit according to a third embodiment of the invention. In the third embodiment, a switching control circuit 50a is used instead of the switching control circuit 50 in the second embodiment illustrated in FIG. 4. A circuit provided in a feedback loop of the switching control circuit 50a is added. The third embodiment maybe the same as the second embodiment except for such a configuration.

As in the second embodiment, if the transistor QN1 is maintained in an OFF state in a period in which the transistor QP1 is in an OFF state, there is concern that an ON period of the transistor QN1 may be shorter than an originally necessary ON period in a case where an ON period of the transistor QP1 is short (for example, in a case where an ON duty ratio is less than 5%).

In this case, since sufficient energy is not accumulated in the inductor L1, and energy accumulated in the inductor L1 is gradually reduced in an OFF period of the transistor QN1, a current flowing through the light emitting element 110 is smaller than a current for which an instruction is given by the analog dimming signal ACS, and thus luminance of the light emitting element 110 is insufficient.

Therefore, in the third embodiment, the switching control circuit 50a activates or inactivates the second control signal GATE in order to bring the transistor QN1 into an ON state or an OFF state in a period in which the first control signal DDRV is activated, maintains the second control signal GATE in an inactivation state in a period in which the first control signal DDRV is inactivated in a case where an ON duty ratio of the first control signal DDRV is equal to or more than a predetermined value, and maintains the second control signal GATE in an activation state in a part of a period in which the first control signal DDRV is inactivated in a case where an ON duty ratio of the first control signal DDRV is less than the predetermined value.

According to the third embodiment, in a case where an ON duty ratio of the first control signal DDRV for digital dimming is equal to or more than a predetermined value, the second control signal GATE for analog dimming is maintained in an inactivation state in a period in which the first control signal DDRV is inactivated, and thus the transistor QN1 is maintained in an OFF state. Consequently, in a case where both of analog dimming and digital dimming are performed, it is possible to prevent energy accumulated in the inductor L1 from being released without being used for light emission, and thus to reduce a power loss.

In a case where an ON duty ratio of the first control signal DDRV for digital dimming is less than the predetermined value, the second control signal GATE for analog dimming is maintained in an activation state in a part of a period in which the first control signal DDRV is inactivated, and thus the transistor QN1 is maintained in an ON state. Consequently, even in a case where a period in which a current flows through the light emitting element 110 is short in digital dimming, energy can be replenished in the inductor L1, and thus it is possible to prevent a current flowing through the light emitting element 110 from being lower than a current for which an instruction is given in analog dimming.

As illustrated in FIG. 8, in addition to the slope compensation circuit 71 to the comparator 75 in the second embodiment illustrated in FIG. 4, a sample-hold circuit 76, a current sense amplifier 77, and a selection circuit 78 are provided in the feedback loop of the switching control circuit 50a.

The drive circuit 30 activates or inactivates the first control signal DDRV in order to bring the transistor QP1 into an ON state or an OFF state. For example, the drive circuit 30 generates an inversion signal by inverting the digital dimming signal DCS supplied from the level shifter 21, and makes a high level potential of the inversion signal substantially the same as the power source potential VDD so as to generate the first control signal DDRV.

The slope compensation circuit 71 adds a bias voltage to a voltage between both ends of the resistor R2 for current detection, so as to generate the detection signal DET, and supplies the detection signal DET to the noninverting input terminal of the comparator 75. The current sense amplifier 72 amplifies a voltage (a current detection voltage) between both ends of the resistor R1, proportional to a current flowing through the light emitting element 110, so as to generate an output signal. The sample-hold circuit 76 is supplied with the power source potential VDD (for example, 50 V) and the power source potential VHB (for example, 45 V) so as to be operated, and samples and holds a current detection voltage proportional to a current flowing through the light emitting element 110 when the first control signal DDRV is activated.

In a case where an ON duty ratio of the first control signal DDRV is reduced, a period in which a current flows through the light emitting element 110 is short, but the sample-hold circuit 76 has an operation speed higher than that of an operational amplifier, and can thus measure a current flowing through the light emitting element 110 with high accuracy. The current sense amplifier 77 amplifies the current detection voltage held in the sample-hold circuit 76 so as to generate an output signal.

The selection circuit 78 selects one of the output signal from the current sense amplifier 72 and the output signal from the current sense amplifier 77 according to a selection signal supplied from the switching control circuit 50a, and supplies the selected signal to the inverting input terminal of the operational amplifier 73. The analog dimming signal ACS is supplied to the noninverting input terminal of the operational amplifier 73. The operational amplifier 73 amplifies a difference between a voltage of the analog dimming signal ACS and a voltage of the signal selected by the selection circuit 78 so as to generate the error signal ERR, and supplies the error signal ERR to the switch circuit 74.

The switch circuit 74 is in an OFF state in a period in which the digital dimming signal DCS is inactivated to a low level and a predetermined mask period, and is in an ON state in other periods, according to control signals supplied from the switching control circuit 50a. Consequently, a voltage of the error signal ERR generated when the switch circuit 74 is in an ON state is held in the capacitor C3, and is supplied to the inverting input terminal of the comparator 75.

The comparator 75 compares a voltage of the detection signal DET supplied from the slope compensation circuit 71 with a voltage of the error signal ERR so as to generate a comparison result signal COMP corresponding to a comparison result, and supplies the comparison result signal COMP to the switching control circuit 50a.

The switching control circuit 50a activates or inactivates the second control signal GATE in order to bring the transistor QN1 into an ON state or an OFF state on the basis of the clock signal CLK, the comparison result signal COMP, and the digital dimming signal DCS supplied from the level shifter 21.

Figure 9:
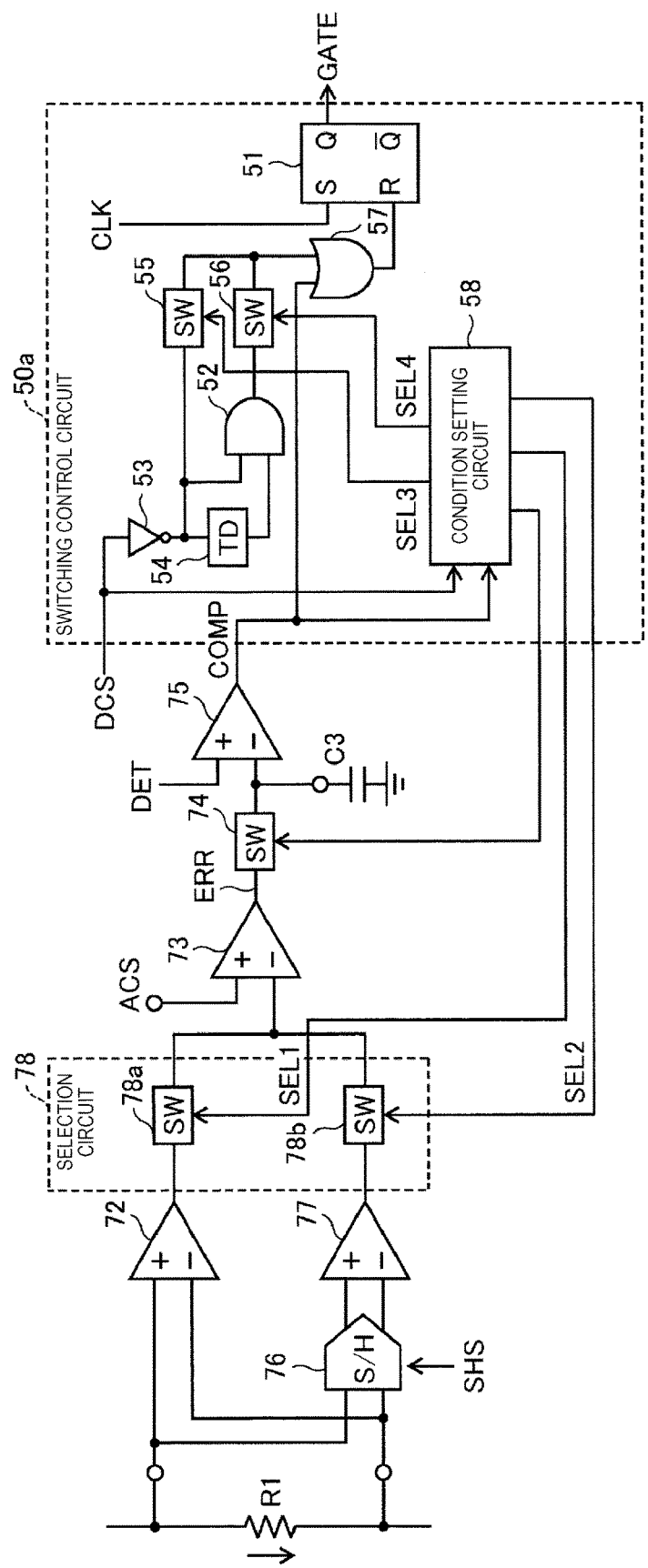
FIG. 9 is a circuit diagram illustrating a switching control circuit illustrated in FIG. 8 and a feedback loop thereof.

FIG. 9 is a circuit diagram illustrating configuration examples of the switching control circuit illustrated in FIG. 8 and a circuit of the feedback loop thereof. In this example, the switching control circuit 50a includes an RS flip-flop 51, an AND circuit 52, an inverter 53, a delay circuit 54, switch circuits 55 and 56, an OR circuit 57, and a condition setting circuit 58.

The RS flip-flop 51 is set in synchronization with rising of the clock signal CLK when an output signal from the OR circuit 57 is in a low level, and activates the second control signal GATE to a high level, and is reset in synchronization with rising of an output signal from the OR circuit 57 when the clock signal CLK is in a low level, and inactivates the second control signal GATE to a low level.

The inverter 53 inverts the digital dimming signal DCS supplied from the level shifter 21 (FIG. 8) so as to generate an output signal. The delay circuit 54 is configured with, for example, delay elements such as a plurality of inverters, or resistors and capacitors, causing gate delay, and delays an output signal from the inverter 53 by a delay time TD.

The AND circuit 52 obtains a logical product between the output signal from the inverter 53 and the output signal from the delay circuit 54, so as to generate an output signal. The output signal from the AND circuit 52 has a low level at the time at which the digital dimming signal DCS is activated, and has a high level at the time at which the delay time TD elapses after the digital dimming signal DCS is inactivated.

The switch circuits 55 and 56 are configured with, for example, analog switches or the like, and select one of the output signal from the inverter 53 and the output signal from the AND circuit 52. The OR circuit 57 obtains a logical sum between the signal selected by the switch circuits 55 and 56, and the comparison result signal COMP output from the comparator 75, so as to generate an output signal. The output signal from the OR circuit 57 is supplied to a reset terminal of the RS flip-flop 51.

The OR circuit 57 generates a high level output signal in a case where the signal selected by the switch circuits 55 and 56 has a high level, or a voltage of the detection signal DET is higher than a voltage of the error signal ERR, and thus the comparison result signal COMP has a high level. Consequently, the RS flip-flop 51 is reset, and thus the second control signal GATE is inactivated.

The condition setting circuit 58 is configured with, for example, a logic circuit including a combinational circuit or a sequential circuit, and controls the switch circuits 55 and 56, the switch circuit 74, and the selection circuit 78. The selection circuit 78 includes, for example, switch circuits 78a and 78b configured with N-channel MOS transistors or various transistors, selects one of the output signal from the current sense amplifier 72 and the output signal from the current sense amplifier 77, and supplies the selected signal to the inverting input terminal of the operational amplifier 73.

First Operation Example

In a first operation example, the light emission control circuit 100 (FIG. 8) receives information regarding an ON duty ratio of the digital dimming signal DCS, that is, information regarding an ON duty ratio of the first control signal DDRV, from an external microcomputer or the like. Consequently, the switching control circuit 50a can adjust an inactivation timing of the second control signal GATE on the basis of the information regarding an ON duty ratio of the first control signal DDRV.

For example, four types of dimming modes are set according to an ON duty ratio of the first control signal DDRV, and information for specifying the current dimming mode is supplied to the condition setting circuit 58. The condition setting circuit 58 sets a condition for inactivating the second control signal GATE on the basis of the information for specifying the current dimming mode, and generates selection signals SEL1 to SEL4.

In a first dimming mode, an ON duty ratio of the first control signal DDRV is 100%, and only analog dimming is performed. In a second dimming mode, an ON duty ratio of the first control signal DDRV is 50% or more and below 100%. In a third dimming mode, an ON duty ratio of the first control signal DDRV is 5% or more and below 50%. In a fourth dimming mode, an ON duty ratio of the first control signal DDRV is over 0% and below 5%. In the second to fourth dimming modes, both of analog dimming and digital dimming are performed. In the present embodiment or other embodiments, a lower limit value (for example, 1%) may be provided in an ON duty ratio.

In the first dimming mode and the second dimming mode, the condition setting circuit 58 activates the selection signal SEL1, and also inactivates the selection signal SEL2. Consequently, since the switch circuit 78a is brought into an ON state, and the switch circuit 78b is brought into an OFF state, an output signal from the current sense amplifier 72 is supplied to the inverting input terminal of the operational amplifier 73.

On the other hand, in the third dimming mode and the fourth dimming mode, the condition setting circuit 58 inactivates the selection signal SEL1, and activates the selection signal SEL2. Consequently, since the switch circuit 78a is brought into an OFF state, and the switch circuit 78b is brought into an ON state, an output signal from the current sense amplifier 77 is supplied to the inverting input terminal of the operational amplifier 73.

Therefore, in a case where an ON duty ratio of the first control signal DDRV is equal to or more than 50%, an output signal from the current sense amplifier 72 which amplifies a current detection voltage proportional to a current flowing through the light emitting element 110 is used to adjust an inactivation timing of the second control signal GATE. On the other hand, in a case where an ON duty ratio of the first control signal DDRV is less than 50%, an output signal from the current sense amplifier 77 which amplifies a current detection voltage held in the sample-hold circuit 76 is used to adjust an inactivation timing of the second control signal GATE.

In the first dimming mode to the third dimming mode, the condition setting circuit 58 activates the selection signal SEL3, and also inactivates the selection signal SEL4. Consequently, since the switch circuit 55 is brought into an ON state, and the switch circuit 56 is brought into an OFF state, an output signal from the inverter 53 is supplied to one input terminal of the OR circuit 57. The comparison result signal COMP output from the comparator 75 is supplied to the other input terminal of the OR circuit 57.

The OR circuit 57 generates a high level output signal in a case where the digital dimming signal DCS is inactivated to a low level, or a voltage of the detection signal DET is higher than a voltage of the error signal ERR, and thus the comparison result signal COMP has a high level. Consequently, the RS flip-flop 51 is reset, and thus the second control signal GATE is inactivated. Therefore, in a case where an ON duty ratio of the first control signal DDRV is equal to or more than 5%, the second control signal GATE is maintained in an inactivation state in a period in which the first control signal DDRV is inactivated.

On the other hand, in the fourth dimming mode, the condition setting circuit 58 inactivates the selection signal SEL3, and also activates the selection signal SEL4. Consequently, since the switch circuit 55 is brought into an OFF state, and the switch circuit 56 is brought into an ON state, an output signal from the AND circuit 52 is supplied to one input terminal of the OR circuit 57. The comparison result signal COMP output from the comparator 75 is supplied to the other input terminal of the OR circuit 57.

The OR circuit 57 generates a high level output signal in a case where the delay time TD elapses after the digital dimming signal DCS is inactivated to a low level, or a voltage of the detection signal DET is higher than a voltage of the error signal ERR, and thus the comparison result signal COMP has a high level. Consequently, the RS flip-flop 51 is reset, and thus the second control signal GATE is inactivated. Therefore, in a case where an ON duty ratio of the first control signal DDRV is less than 5%, the second control signal GATE is maintained in an activation state in a part of a period in which the first control signal DDRV is inactivated.

Since a current flowing through the inductor L1 (FIG. 8) gradually increases after the transistor QN1 is brought into an ON state, the comparison result signal COMP output from the comparator 75 is maintained in a low level before and after a timing at which the first control signal DDRV is inactivated in a case where an ON duty ratio of the first control signal DDRV is low.

Figure 10:
FIG. 10 is a timing chart for explaining an operation example in a first dimming mode.
Figure 11:
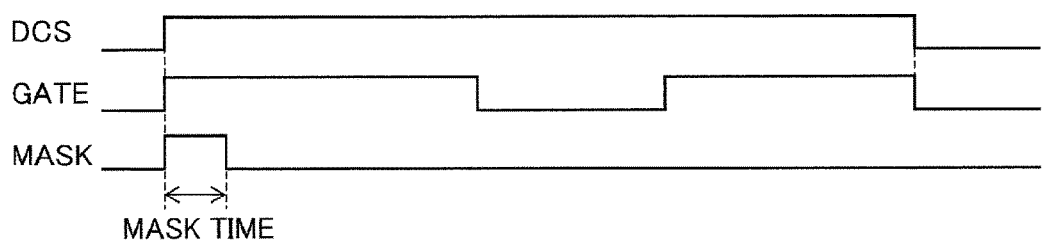
FIG. 11 is a timing chart for explaining an operation example in a second dimming mode.
Figure 12:
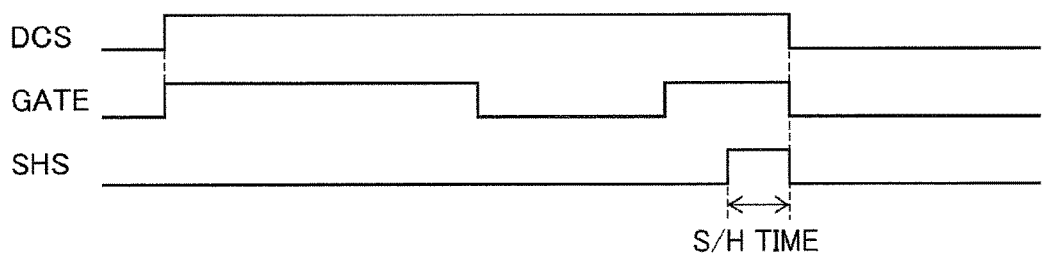
FIG. 12 is a timing chart for explaining an operation example in a third dimming mode.
Figure 13:
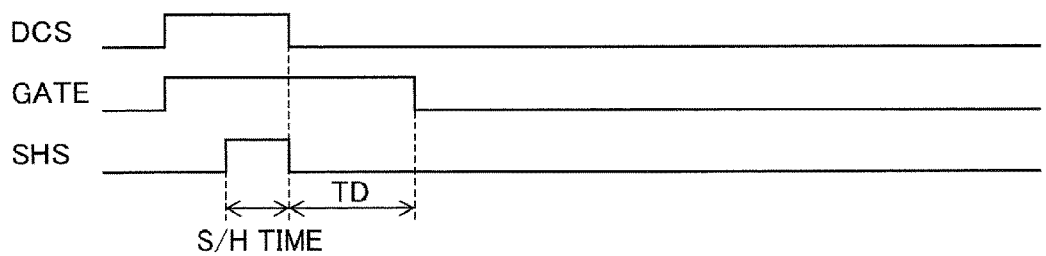
FIG. 13 is a timing chart for explaining an operation example in a fourth dimming mode.

FIGS. 10 to 13 are timing charts for explaining operation examples in the first to fourth dimming modes. As illustrated in FIG. 10, in the first dimming mode, the digital dimming signal DCS is activated to a high level at all times, and thus analog dimming is performed such that the second control signal GATE is activated to a high level, and is inactivated to a low level. On the other hand, as illustrated in FIGS. 11 to 13, in the second to fourth dimming modes, both of analog dimming and digital dimming are performed such that the digital dimming signal DCS is activated to a high level, and is inactivated to a low level.

As illustrated in FIGS. 11 and 12, in the second dimming mode and the third dimming mode, the second control signal GATE is activated to a high level in synchronization with rising of the digital dimming signal DCS. The second control signal GATE is forced to be inactivated to a low level in synchronization with falling of the digital dimming signal DCS.

As illustrated in FIG. 13, in the fourth dimming mode, the second control signal GATE is activated to a high level in synchronization with rising of the digital dimming signal DCS. On the other hand, regarding inactivation of the second control signal GATE, the second control signal GATE is not synchronized with falling of the digital dimming signal DCS, and is inactivated to a low level after being maintained in an activation state for the delay time TD (predetermined period) from the falling of the digital dimming signal DCS.

As illustrated in FIG. 11, in the second dimming mode, the condition setting circuit 58 may generate a mask signal MASK which is activated in a predetermined mask period (MASK TIME) immediately after the digital dimming signal DCS transitions to an activation state. The mask signal MASK is used to turn off the switch circuit 74. Consequently, it is possible to avoid the influence of a measurement error due to a low operation speed of the current sense amplifier 72.

As illustrated in FIGS. 12 and 13, in the third dimming mode and the fourth dimming mode, the condition setting circuit 58 may generate a sample-hold signal SHS which is activated in a predetermined sample-hold period (S/H TIME) immediately before the digital dimming signal DCS transitions to an inactivation state.

The sample-hold signal SHS is used to cause the sample-hold circuit 76 to perform a sample-hold operation. Consequently, the sample-hold circuit 76 can perform a sample-hold operation after a current flowing through the light emitting element 110 is stabilized. Alternatively, the sample-hold signal SHS may be supplied from an external microcomputer or the like to the light emission control circuit 100 (FIG. 8).

In the above-described way, the switching control circuit 50a maintains the second control signal GATE in an activation state in a predetermined period after the first control signal DDRV transitions to an inactivation state from an activation state in a case where an ON duty ratio of the first control signal DDRV is less than a predetermined value (in this example, 5%). Consequently, a period in which the transistor QN1 is in an ON state can be extended by a predetermined period after the first control signal DDRV is inactivated, and thus energy replenished in the inductor L1 can be consecutively increased.

In this case, the switching control circuit 50a may maintain the second control signal GATE in an activation state in a predetermined period in a case where an ON duty ratio of the first control signal DDRV is less than a predetermined value, and the second control signal GATE is not inactivated even once in a period in which the first control signal DDRV is activated. Consequently, a pulse width of the second control signal GATE can be extended only in a case where the second control signal GATE is activated as a single pulse in a period in which the first control signal DDRV is activated.

To do so, the condition setting circuit 58 activates the selection signal SEL3 and also inactivates the selection signal SEL4, for example, in a case where the comparison result signal COMP has a high level at least once in a period in which the digital dimming signal DCS is activated. This state is canceled when the digital dimming signal DCS is activated next.

Second Operation Example

In a second operation example, the condition setting circuit 58 may set a condition for inactivating the second control signal GATE even if information regarding an ON duty ratio of the digital dimming signal DCS is not supplied from the outside. For example, the condition setting circuit 58 generates the selection signals SEL1 to SEL4 on the basis of the digital dimming signal DCS and the comparison result signal COMP output from the comparator 75.

In a case where the comparison result signal COMP has a high level at least once in a period in which the digital dimming signal DCS is activated, the condition setting circuit 58 determines that an ON duty ratio of the first control signal DDRV is equal to or more than a predetermined value, activates the selection signals SEL1 and SEL3, and inactivates the selection signals SEL2 and SEL4.

Consequently, since the switch circuit 78a is brought into an ON state, and the switch circuit 78b is brought into an OFF state, an output signal from the current sense amplifier 72 is supplied to the inverting input terminal of the operational amplifier 73. Consequently, since the switch circuit 55 is brought into an ON state, and the switch circuit 56 is brought into an OFF state, an output signal from the inverter 53 is supplied to one input terminal of the OR circuit 57. The comparison result signal COMP output from the comparator 75 is supplied to the other input terminal of the OR circuit 57.

The OR circuit 57 generates a high level output signal in a case where the digital dimming signal DCS is inactivated to a low level, or a voltage of the detection signal DET is higher than a voltage of the error signal ERR, and thus the comparison result signal COMP has a high level. Consequently, the RS flip-flop 51 is reset, and thus the second control signal GATE is inactivated. Therefore, in a case where an ON duty ratio of the first control signal DDRV is equal to or more than a predetermined value, the second control signal GATE is maintained in an inactivation state in a period in which the first control signal DDRV is inactivated.

On the other hand, in a case where the comparison result signal COMP is not activated even once in a period in which the digital dimming signal DCS is activated, the condition setting circuit 58 determines that an ON duty ratio of the first control signal DDRV is less than a predetermined value, and inactivates the selection signals SEL1 and SEL3, and activates the selection signals SEL2 and SEL4.

Consequently, since the switch circuit 78a is brought into an OFF state, and the switch circuit 78b is brought into an ON state, an output signal from the current sense amplifier 77 is supplied to the inverting input terminal of the operational amplifier 73. Consequently, since the switch circuit 55 is brought into an OFF state, and the switch circuit 56 is brought into an ON state, an output signal from the AND circuit 52 is supplied to one input terminal of the OR circuit 57. The comparison result signal COMP output from the comparator 75 is supplied to the other input terminal of the OR circuit 57.

The OR circuit 57 generates a high level output signal in a case where the delay time TD elapses after the digital dimming signal DCS is inactivated to a low level, or a voltage of the detection signal DET is higher than a voltage of the error signal ERR, and thus the comparison result signal COMP has a high level. Consequently, the RS flip-flop 51 is reset, and thus the second control signal GATE is inactivated. Therefore, in a case where an ON duty ratio of the first control signal DDRV is less than a predetermined value, the second control signal GATE is maintained in an activation state in a part of a period in which the first control signal DDRV is inactivated.

Since a current flowing through the inductor L1 (FIG. 8) gradually increases after the transistor QN1 is brought into an ON state, the comparison result signal COMP output from the comparator 75 is maintained in a low level before and after a timing at which the first control signal DDRV is inactivated in a case where an ON duty ratio of the first control signal DDRV is low.

Fourth Embodiment

Figure 14:
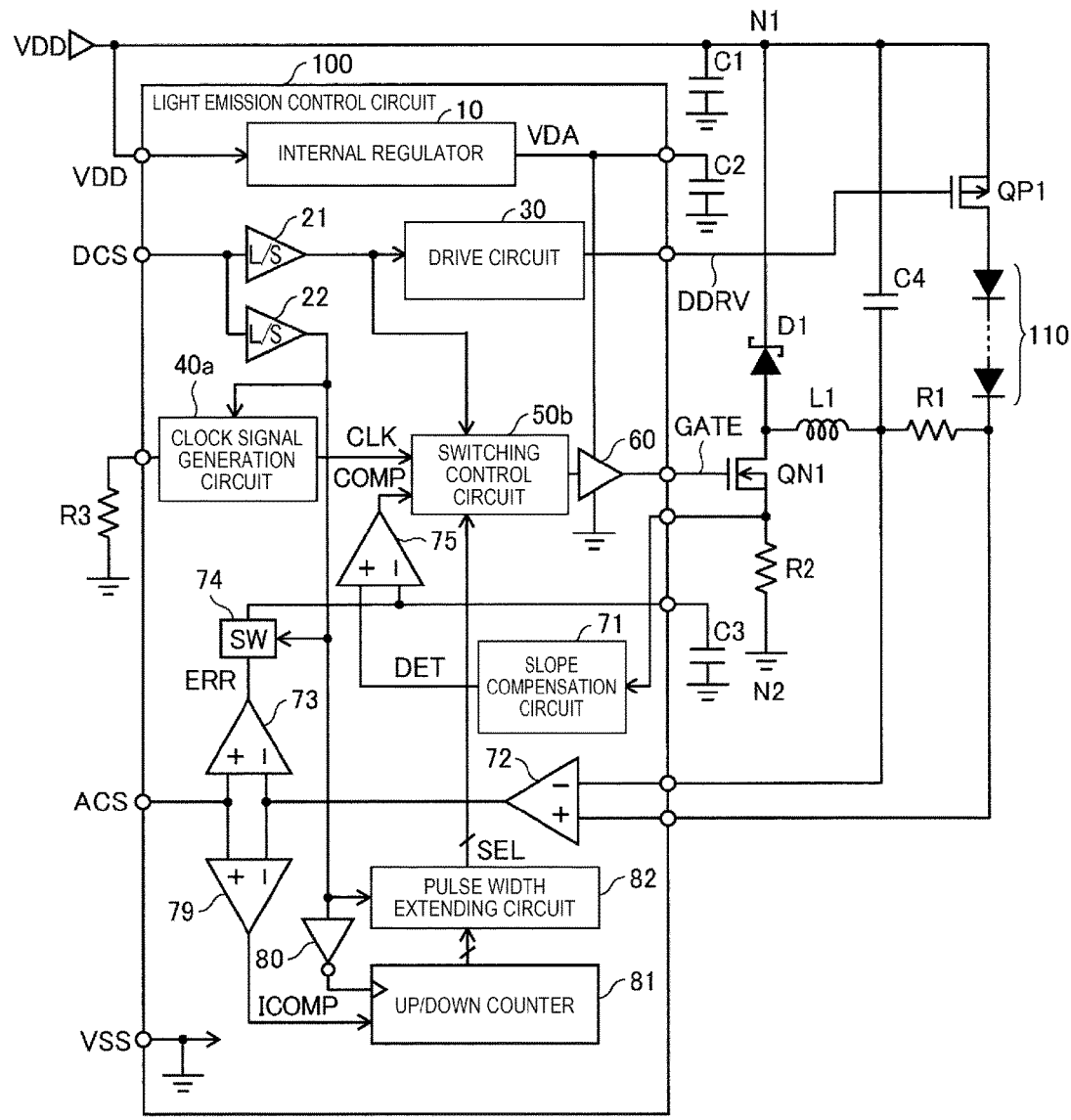
FIG. 14 is a circuit diagram illustrating a light source device including a light emission control circuit according to a fourth embodiment of the invention.

FIG. 14 is a circuit diagram illustrating a configuration example of a light source device including a light emission control circuit according to a fourth embodiment of the invention. In the fourth embodiment, a switching control circuit 50b is used instead of the switching control circuit 50 in the second embodiment illustrated in FIG. 4. A comparator 79, an inverter 80, an up/down counter 81, and a pulse width extending circuit 82 are added. The fourth embodiment may be the same as the second embodiment except for such a configuration.

The slope compensation circuit 71 adds a bias voltage to a voltage between both ends of the resistor R2 for current detection, so as to generate the detection signal DET, and supplies the detection signal DET to the noninverting input terminal of the comparator 75. The current sense amplifier 72 amplifies a voltage (a current detection voltage) between both ends of the resistor R1, proportional to a current flowing through the light emitting element 110, so as to generate an output signal. The comparator 75 compares a voltage of the detection signal DET supplied from the slope compensation circuit 71 with a voltage of the error signal ERR so as to generate the comparison result signal COMP corresponding to a comparison result, and supplies the comparison result signal COMP to the switching control circuit 50b.

The comparator 79 compares a voltage of the output signal from the current sense amplifier 72 with a voltage of the analog dimming signal ACS so as to generate an output signal ICOMP corresponding to a comparison result. The output signal ICOMP from the comparator 79 has a high level in a case where a current flowing through the light emitting element 110 is less than a predetermined value, and has a low level in a case where a current flowing through the light emitting element 110 is more than the predetermined value. Some response time is required for an output voltage of the current sense amplifier 72 and an output level of the comparator 79 to change, and thus the previous state is maintained at the time at which the digital dimming signal DCS falls. The output signal ICOMP from the comparator 79 is supplied to the up/down counter 81.

The inverter 80 inverts the digital dimming signal DCS supplied from the level shifter 22, and supplies the inverted digital dimming signal DCS to the up/down counter 81. The up/down counter 81 performs an up-count operation or a down-count operation according to the output signal ICOMP from the comparator 79 in synchronization with falling of the digital dimming signal DCS.

For example, when power is supplied, a count value of the up/down counter 81 is reset to an initial value. The up/down counter 81 increments a count value when the output signal ICOMP from the comparator 79 has a high level, and decrements a count value when the output signal ICOMP from the comparator 79 has a low level, in synchronization with falling of the digital dimming signal DCS.

The pulse width extending circuit 82 is configured with, for example, a logic circuit including a combinational circuit or a sequential circuit, generates a selection signal SEL used to select an activation period (pulse width) of the second control signal GATE on the basis of a count value in the up/down counter 81, and outputs the selection signal SEL to the switching control circuit 50b.

The switching control circuit 50b activates or inactivates the second control signal GATE in order to bring the transistor QN1 into an ON state or an OFF state on the basis of the clock signal CLK, the comparison result signal COMP, the selection signal SEL, and the digital dimming signal DCS supplied from the level shifter 21.

Figure 15:
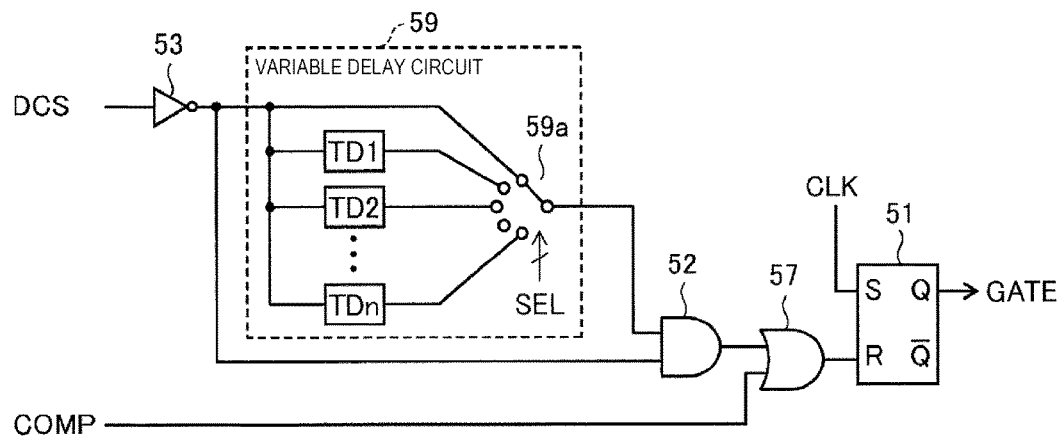
FIG. 15 is a circuit diagram illustrating a configuration example of a switching control circuit illustrated in FIG. 14.

FIG. 15 is a circuit diagram illustrating a configuration example of the switching control circuit illustrated in FIG. 14. In this example, the switching control circuit 50b includes an RS flip-flop 51, an AND circuit 52, an inverter 53, an OR circuit 57, and a variable delay circuit 59.

The RS flip-flop 51 is set in synchronization with rising of the clock signal CLK when an output signal from the OR circuit 57 is in a low level, and activates the second control signal GATE to a high level, and is reset in synchronization with rising of an output signal from the OR circuit 57 when the clock signal CLK is in a low level, and inactivates the second control signal GATE to a low level.

The inverter 53 inverts the digital dimming signal DCS so as to generate an output signal, and supplies the output signal to the variable delay circuit 59. The variable delay circuit 59 includes a plurality of delay circuits to which output signals from the inverter 53 are supplied in parallel, and a selection circuit 59*a* which selects one signal from among an output signal from the inverter 53 and output signals from the plurality of delay circuits. For example, each delay circuit is configured with, for example, delay elements such as a plurality of inverters, or resistors and capacitors, causing gate delay, and the selection circuit 59*a* is configured with a plurality of analog switches or the like.

The plurality of delay circuits have different delay times TD1, TD2, ..., and TDn, and delay the digital dimming signal DCS inverted by the inverter 53. The selection circuit 59*a* selects the delay time TD for the digital dimming signal DCS inverted by the inverter 53 according to the selection signal SEL supplied from the pulse width extending circuit 82 (FIG. 14).

The AND circuit 52 obtains a logical product between the output signal from the inverter 53 and the output signal from the variable delay circuit 59, so as to generate an output signal. The output signal from the AND circuit 52 has a low level at the time at which the digital dimming signal DCS is activated, and has a high level at the time at which the delay time TD (where TD≥0) elapses after the digital dimming signal DCS is inactivated.

The OR circuit 57 obtains a logical sum between the output signal from the AND circuit 52 and the comparison result signal COMP output from the comparator 75 (FIG. 14), so as to generate an output signal. The output signal from the OR circuit 57 is supplied to the reset terminal of the RS flip-flop 51. The OR circuit 57 generates a high level output signal in a case where the output signal from the AND circuit 52 has a high level, or a voltage of the detection signal DET is higher than a voltage of the error signal ERR, and thus the comparison result signal COMP has a high level. Consequently, the RS flip-flop 51 is reset, and thus the second control signal GATE is inactivated.

Operation Example

Figure 16:
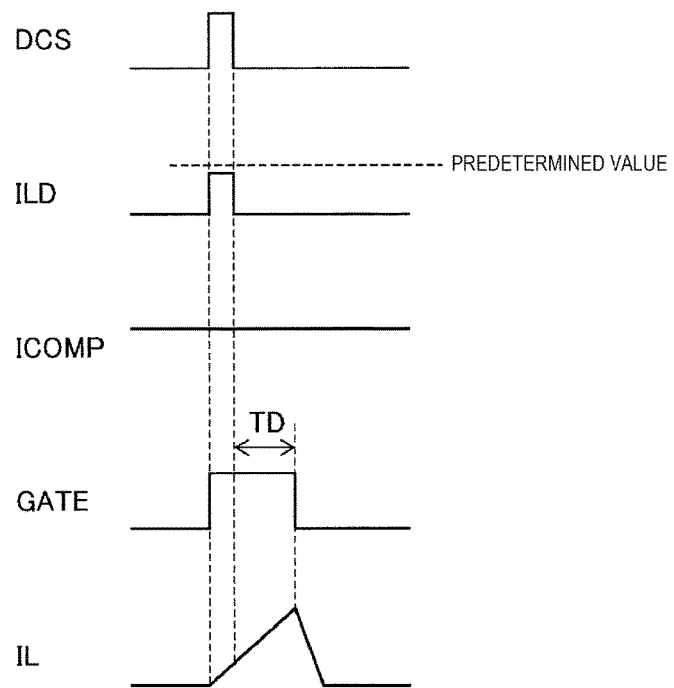
FIG. 16 is a waveform diagram for explaining an operation example of a light emission control circuit illustrated in FIG. 14.

A description will be made of an operation example of the light emission control circuit according to the fourth embodiment of the invention with reference to FIGS. 14 to 16. FIG. 16 is a waveform diagram for explaining an operation example of the light emission control circuit illustrated in FIG. 14.

In a case where the digital dimming signal DCS is activated to a high level, the first control signal DDRV is activated to a low level such that the transistor QP1 is brought into an ON state, and then a current ILD flows through the light emitting element 110. The switching control circuit 50*b* activates or inactivates the second control signal GATE in order to bring the transistor QN1 into an ON state or an OFF state in a period in which the first control signal DDRV is activated.

In a case where the second control signal GATE is activated to a high level in synchronization with activation of the digital dimming signal DCS, the transistor QN1 is brought into an ON state, and thus a current IL flows through the inductor L1. The current IL flowing through the inductor L1 gradually increases over time. In a period illustrated in FIG. 16, the current IL flowing through the inductor L1 is small, and thus the comparison result signal COMP output from the comparator 75 has a low level.

As illustrated in FIG. 16, in a case where the current ILD flowing through the light emitting element 110 is less than a predetermined value when the first control signal DDRV is activated, the output signal ICOMP from the comparator 79 has a high level, and the up/down counter 81 is set to an up-count mode.

Thereafter, in a case where the digital dimming signal DCS is inactivated to a low level, the first control signal DDRV is inactivated to a high level such that the transistor QP1 is brought into an OFF state, and the current ILD does not flow through the light emitting element 110. The up/down counter 81 increments a count value in synchronization with falling of the digital dimming signal DCS, and thus a count value in the up/down counter 81 is greater than the previous value.

The pulse width extending circuit 82 outputs, to the switching control circuit 50*b*, the selection signal SEL for selecting an output signal from a delay circuit having the delay time TD corresponding to a difference between the count value and the initial value. In the switching control circuit 50*b*, the selection circuit 59*a* selects an output signal from a delay circuit having the increased delay time TD. Consequently, after the delay time TD elapses from inactivation of the digital dimming signal DCS, an output signal from the AND circuit 52 has a high level, an output signal from the OR circuit 57 has a high level, and the RS flip-flop 51 inactivates the second control signal GATE.

Here, a period in which the output signal from the AND circuit 52 has a high level corresponds to a period in which activation of the second control signal GATE for analog dimming is prohibited. Therefore, in a case where the delay time TD is increased, the period in which activation of the second control signal GATE for analog dimming is prohibited is reduced within a period in which the first control signal DDRV for digital dimming is inactivated.

In a case where the second control signal GATE is inactivated to a low level, the transistor QN1 is brought into an OFF state, and thus the current IL flowing through the inductor L1 is reduced. Such an operation is repeatedly performed each time the digital dimming signal DCS is activated and inactivated, and thus a pulse width of the second control signal GATE gradually increases.

Next, in a case where the current ILD flowing through the light emitting element 110 is more than a predetermined value when the digital dimming signal DCS is activated to a high level, the output signal ICOMP from the comparator 79 has a low level, and the up/down counter 81 is set to a down-count mode.

In a case where the digital dimming signal DCS is inactivated to a low level, the first control signal DDRV is inactivated to a high level such that the transistor QP1 is brought into an OFF state, and the current ILD does not flow through the light emitting element 110. The up/down counter 81 decrements a count value in synchronization with falling of the digital dimming signal DCS, and thus a count value in the up/down counter 81 is smaller than the previous value.

The pulse width extending circuit 82 outputs, to the switching control circuit 50*b*, the selection signal SEL for selecting an output signal from a delay circuit having the delay time TD corresponding to a difference between the count value and the initial value. In the switching control circuit 50*b*, the selection circuit 59*a* selects an output signal from a delay circuit having the reduced delay time TD. Consequently, after the delay time TD elapses from inactivation of the digital dimming signal DCS, the second control signal GATE is inactivated to a low level.

In a case where a count value in the up/down counter 81 is equal to or smaller than a lower limit value, the pulse width extending circuit 82 outputs the selection signal SEL for selecting an output signal from the inverter 53 to the switching control circuit 50b. In the switching control circuit 50b, the selection circuit 59a selects an output signal from the inverter 53. Consequently, when the digital dimming signal DCS is inactivated, the second control signal GATE is inactivated to a low level.

Here, a period in which the output signal from the AND circuit 52 has a high level corresponds to a period in which activation of the second control signal GATE for analog dimming is prohibited. Therefore, in a case where the delay time TD is reduced, the period in which activation of the second control signal GATE for analog dimming is prohibited is extended within a period in which the first control signal DDRV for digital dimming is inactivated. The period is extended at most to the same period as an inactivation period of the first control signal DDRV.

In a case where the second control signal GATE is inactivated to a low level, the transistor QN1 is brought into an OFF state, and thus the current IL flowing through the inductor L1 is reduced. Each time the digital dimming signal DCS is activated and inactivated, an increase or a decrease in a pulse width of the second control signal GATE is repeated, and thus a pulse width of the second control signal GATE converges to an appropriate value.

As mentioned above, according to the fourth embodiment, in a case where a current flowing through the light emitting element 110 is less than a predetermined value when the first control signal DDRV for digital dimming is activated, a period in which activation of the second control signal GATE for analog dimming is prohibited is reduced within a period in which the first control signal DDRV is inactivated. Consequently, even in a case where a period in which a current flows through the light emitting element 110 is short in digital dimming, energy can be replenished in the inductor L1, and thus it is possible to prevent a current flowing through the light emitting element 110 from being lower than a current for which an instruction is given in analog dimming.

In a case where a current flowing through the light emitting element 110 is more than a predetermined value when the first control signal DDRV for digital dimming is activated, a period in which activation of the second control signal GATE for analog dimming is prohibited is extended within a period in which the first control signal DDRV is inactivated. Consequently, in a case where both of analog dimming and digital dimming are performed, it is possible to prevent energy accumulated in the inductor L1 from being released without being used for light emission, and thus to reduce a power loss.

Modification Example of Fourth Embodiment

In the same manner as the light emission control circuit 100 illustrated in FIG. 8, the light emission control circuit 100 illustrated in FIG. 14 may include the sample-hold circuit 76 which samples and holds a current detection voltage proportional to a current flowing through the light emitting element 110 when the first control signal DDRV is activated, and the current sense amplifier 77 which amplifies the current detection voltage held in the sample-hold circuit 76 so as to generate an output signal. In this case, the output signal from the current sense amplifier 77 is supplied to the inverting input terminal of the comparator 79.

Fifth Embodiment

In a fifth embodiment of the invention, the switching control circuit 50a in the third embodiment illustrated in FIG. 9 includes the variable delay circuit 59 illustrated in FIG. 15. Consequently, it is possible to vary an extension period of a pulse width of the second control signal GATE. The fifth embodiment may be the same as the third embodiment except for such a configuration.

The switching control circuit 50a maintains the second control signal GATE in an inactivation state in a period in which the first control signal DDRV is inactivated in a case where an ON duty ratio of the first control signal DDRV is equal to or more than a predetermined value, and maintains the second control signal GATE in an activation state in a predetermined period after the first control signal DDRV transitions to an inactivation state from an activation state in a case where an ON duty ratio of the first control signal DDRV is less than the predetermined value.

In this case, the switching control circuit 50a may set the predetermined period to a first period in a case where an ON duty ratio of the first control signal DDRV is a first value, and may set the predetermined period to a second period longer than the first period in a case where an ON duty ratio of the first control signal DDRV is a second value smaller than the first value. Consequently, in a case where a period is short in which a current flows through the light emitting element 110 in digital dimming, it is possible to further increase energy replenished in the inductor L1.

For example, five types of dimming modes are set according to an ON duty ratio of the first control signal DDRV, and information for specifying the current dimming mode is supplied to the condition setting circuit 58. The condition setting circuit 58 sets the predetermined period to zero in a dimming mode in which an ON duty ratio of the first control signal DDRV is equal to or more than 5%, and sets the predetermined period to TA1 (where TA1>0) in a dimming mode in which an ON duty ratio of the first control signal DDRV is 4%.

The condition setting circuit 58 sets the predetermined period to TA2 (where TA2>TA1) in a dimming mode in which an ON duty ratio of the first control signal DDRV is 3%, sets the predetermined period to TA3 (where TA3>TA2) in a dimming mode in which an ON duty ratio of the first control signal DDRV is 2%, and sets the predetermined period to TA4 (where TA4>TA3) in a dimming mode in which an ON duty ratio of the first control signal DDRV is 1%.

The light emission control circuit 100 illustrated in FIG. 8 may include the comparator 79 to the pulse width extending circuit 82 illustrated in FIG. 14. In this case, the switching control circuit 50a may adjust the predetermined period on the basis of a current flowing through the light emitting element 110 according to the selection signal SEL supplied from the pulse width extending circuit 82. Consequently, in a case where a current flowing through the light emitting element 110 is smaller, it is possible to further increase energy replenished in the inductor L1.

For example, in a case where a current flowing through the light emitting element 110 is less than a predetermined value when the first control signal DDRV is activated, the up/down counter 81 increments a count value each time the digital dimming signal DCS is activated and inactivated, and thus a difference between the count value and the initial value gradually increases. The pulse width extending circuit 82 sequentially generates the selection signal SEL for selecting an output signal from a delay circuit having the delay time TD corresponding to the difference between the count value and the initial value, and supplies the selection signal SEL to the switching control circuit 50a.

In the variable delay circuit 59 (FIG. 15) provided in the switching control circuit 50a, the selection circuit 59a sequentially selects an output signal from a delay circuit having the gradually increased delay time TD according to the selection signal SEL. Consequently, an extension period of a pulse width of the second control signal GATE is gradually increased.

Alternatively, in a case where an ON duty ratio of the first control signal DDRV is less than a predetermined value, the switching control circuit 50a may extend, by a first period, a period in which the second control signal GATE is maintained in an activation state after the first control signal DDRV transitions from an activation state to an inactivation state in a case where a current flowing through the light emitting element 110 is less than a predetermined value when the first control signal DDRV is activated, and may reduce, by a second period, a period in which the second control signal GATE is maintained in an activation state after the first control signal DDRV transitions from an activation state to an inactivation state in a case where a current flowing through the light emitting element 110 is more than the predetermined value when the first control signal DDRV is activated.

In this case, the second period is preferably longer than the first period. For example, in a case where an ON duty ratio of the first control signal DDRV changes from a first value (for example, 1%) to a second value (for example, 2%) greater than the first value, if the second control signal GATE is generated according to an extension period which is set when an ON duty ratio is the first value, a current flowing through the light emitting element 110 is excessive. Therefore, in a case where an extension period is set next, the extension period is reduced by the second period longer than the first period, and thus it is possible to remove an excessive current early. For example, the second period may be twice longer than the first period.

Sixth Embodiment

Figure 17:
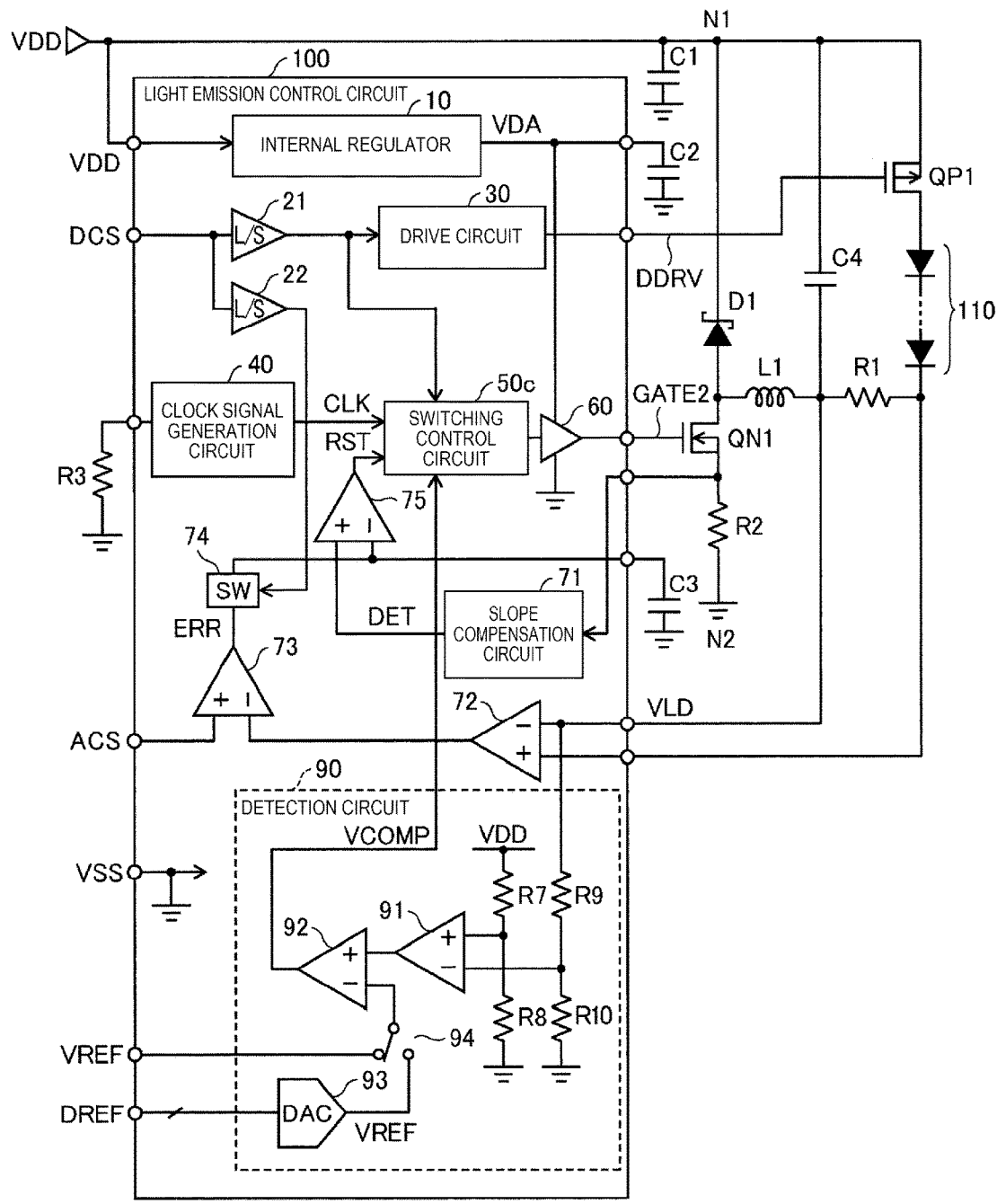
FIG. 17 is a circuit diagram illustrating a light source device including a light emission control circuit according to a sixth embodiment of the invention.

FIG. 17 is a circuit diagram illustrating a configuration example of a light source device including a light emission control circuit according to a sixth embodiment of the invention. In the sixth embodiment, a switching control circuit 50c is used instead of the switching control circuit 50 in the second embodiment illustrated in FIG. 1 or 4. A detection circuit 90 which compares a potential difference between both ends of the light emitting element 110 with a reference voltage VREF is added. The sixth embodiment may be the same as the first embodiment or the second embodiment except for such a configuration.

As illustrated in FIG. 17, the detection circuit 90 includes resistors R7 to R10, an operational amplifier 91, and a comparator 92, and may further include a DAC 93, and a switch circuit 94. The resistors R7 and R8 configure a first voltage division circuit which divides the power source potential VDD. The resistors R9 and R10 configure a second voltage division circuit which divides a detected potential VLD at the contact point between the capacitor C4 and the inductor L1. A division ratio of the first voltage division circuit may be the same as a division ratio of the second voltage division circuit.

Consequently, the first and second voltage division circuits divide a potential difference between both ends of the capacitor C4 at predetermined division ratios, and, for example, the operational amplifier 91 which is operated by being supplied with power source potentials of 5 V and 0 V amplifies the divided potential difference at a predetermined amplification ratio. The transistor QP1 is periodically brought into an ON state according to the first control signal DDRV, and thus a potential difference between both ends of the capacitor C4 is substantially the same as a potential difference between both ends of the light emitting element 110.

The comparator 92 compares an output voltage of the operational amplifier 91 with the reference voltage VREF, and generates an output signal VCOMP corresponding to a comparison result. In the above-described way, the detection circuit 90 inactivates the output signal VCOMP to a low level in a case where a potential difference between both ends of the light emitting element 110 is less than a predetermined value, and activates the output signal VCOMP to a high level in a case where a potential difference between both ends of the light emitting element 110 is more than the predetermined value.

The detection circuit 90 may be supplied with the reference voltage VREF used to detect whether a potential difference between both ends of the light emitting element 110 is less than or more than a predetermined value, from an external microcomputer or the like. Alternatively, the detection circuit 90 may receive information (data) DREF regarding the reference voltage VREF from the microcomputer or the like. The DAC 93 converts the data DREF supplied from the outside into the reference voltage VREF.

In this case, even if voltage-current characteristics of the light emitting element 110 vary due to a temperature, the variation due to a temperature can be compensated by setting the reference voltage VREF corresponding to the temperature from a microcomputer or the like having temperature information of the light source device. The switch circuit 94 may be provided to select one of the reference voltage VREF supplied from the outside and the reference voltage VREF supplied from the DAC 93. The output signal VCOMP from the detection circuit 90 is supplied to the switching control circuit 50c.

The switching control circuit 50c activates or inactivates the second control signal GATE in order to bring the transistor QN1 into an ON state or an OFF state on the basis of the clock signal CLK, the reset signal RST, the output signal VCOMP from the detection circuit 90, and the digital dimming signal DCS supplied from the level shifter 21.

Figure 18:
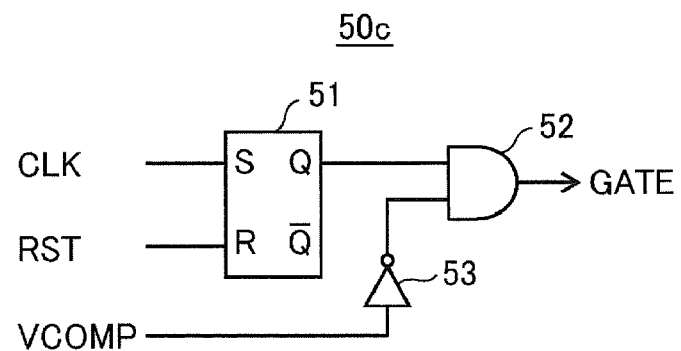
FIG. 18 is a circuit diagram illustrating a configuration example of a switching control circuit illustrated in FIG. 17.

FIG. 18 is a circuit diagram illustrating a configuration example of the switching control circuit illustrated in FIG. 17. In this example, the switching control circuit 50c includes an RS flip-flop 51, an AND circuit 52, and an inverter 53.

The RS flip-flop 51 activates an output signal to a high level in synchronization with the clock signal CLK, and inactivates an output signal in synchronization with the reset signal RST which is generated on the basis of a current flowing through the transistor QN1 and a current flowing through the light emitting element 110. The AND circuit 52 corresponds to a mask circuit which masks an output signal from the RS flip-flop 51 according to the output signal VCOMP from the detection circuit 90.

In a case where the RS flip-flop 51 or the circuits of the feedback loop thereof are stopped to mask an output signal from the RS flip-flop 51, returning of the second control signal GATE requires time, but, in a case where an output signal from the RS flip-flop 51 is masked, it is possible to reduce the time required for returning of the second control signal GATE.

The inverter 53 inverts the output signal VCOMP from the detection circuit 90, and supplies the inverted output signal VCOMP to the AND circuit 52. The AND circuit 52 outputs an output signal from the RS flip-flop 51 as the second control signal GATE in a case where the output signal VCOMP from the detection circuit 90 is inactivated to a low level, and an output signal from the inverter 53 has a high level, and maintains the second control signal GATE in an activation state in a case where the output signal VCOMP from the detection circuit 90 is activated to a high level, and an output signal from the inverter 53 has a low level.

Operation Example

Figure 19:
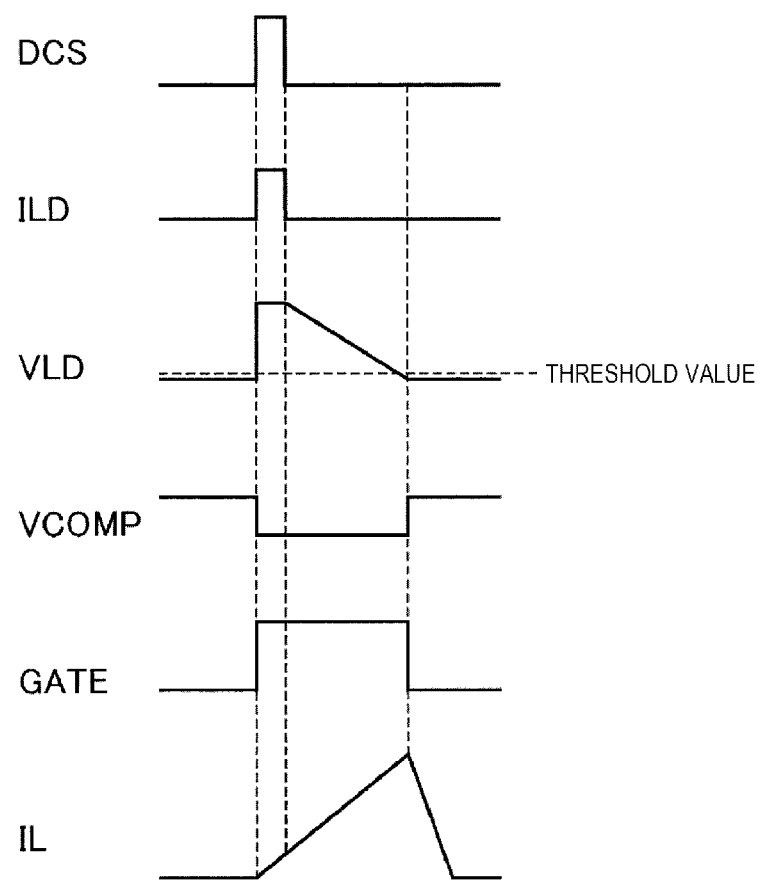
FIG. 19 is a waveform diagram for explaining an operation example of a light emission control circuit illustrated in FIG. 17.

A description will be made of an operation example of the light emission control circuit according to the sixth embodiment of the invention with reference to FIGS. 17 to 19. FIG. 19 is a waveform diagram for explaining an operation example of the light emission control circuit illustrated in FIG. 17. FIG. 19 illustrates a case where an ON duty ratio of the digital dimming signal (an ON duty ratio of the first control signal DDRV) is less than a predetermined value.

In a case where the digital dimming signal DCS is activated to a high level, the first control signal DDRV is activated to a low level such that the transistor QP1 is brought into an ON state, and then a current ILD flows through the light emitting element 110. Consequently, in a case where the detected potential VLD exceeds a threshold value such that a potential difference between both ends of the light emitting element 110 is less than a predetermined value, the output signal VCOMP from the detection circuit 90 is inactivated to a low level.

In a case where the output signal VCOMP from the detection circuit 90 is inactivated to a low level, the AND circuit 52 outputs an output signal from the RS flip-flop 51 as the second control signal GATE. Consequently, in a case where a potential difference between both ends of the light emitting element 110 is less than a predetermined value, the switching control circuit 50c activates the second control signal GATE in at least a partial period in order to bring the transistor QN1 into an ON state.

In a case where the second control signal GATE is activated to a high level, the transistor QN1 is brought into an ON state, and thus a current IL flows through the inductor L1. The current IL flowing through the inductor L1 gradually increases over time. In a period illustrated in FIG. 19, the current IL flowing through the inductor L1 is small, and thus the reset signal RST output from the comparator 75 has a low level.

Thereafter, in a case where the digital dimming signal DCS is inactivated to a low level, the first control signal DDRV is inactivated to a high level such that the transistor QP1 is brought into an OFF state, and the current ILD does not flow through the light emitting element 110. Consequently, a current is not supplied from the light emitting element 110 to the inductor L1, and thus the detected potential VLD gradually decreases. In a case where the detected potential VLD becomes less than a threshold value, and thus a potential difference between both ends of the light emitting element 110 becomes more than a predetermined value, the output signal VCOMP from the detection circuit 90 is activated to a high level.

In a case where the output signal VCOMP from the detection circuit 90 is activated to a high level, the AND circuit 52 inactivates an output signal to a low level. Consequently, the switching control circuit 50c maintains the second control signal GATE in an inactivation state in order to bring the transistor QN1 into an OFF state in a case where a potential difference between both ends of the light emitting element 110 is more than a predetermined value.

In a case where the second control signal GATE is inactivated to a low level, the transistor QN1 is brought into an OFF state such that the current IL flowing through the inductor L1 is reduced, and thus the detected potential VLD stops decreasing. In the above-described way, the switching control circuit 50c adjusts activation and inactivation of the second control signal GATE such that a potential difference between both ends of the light emitting element 110 comes close to a predetermined value.

Although not illustrated in FIG. 19, in a case where an ON duty ratio of the digital dimming signal DCS is equal to or more than a predetermined value, the reset signal RST may be activated earlier than the output signal VCOMP of the detection circuit 90 is activated. In this case, the switching control circuit 50c inactivates the second control signal GATE in synchronization with activation of the reset signal RST. The switching control circuit 50c may repeat activation and inactivation of the second control signal GATE in synchronization with the clock signal CLK and the reset signal RST.

According to the sixth embodiment, in a case where a potential difference between both ends of the light emitting element 110 is more than a predetermined value, the second control signal GATE for analog dimming is maintained in an inactivation state, and thus the transistor QN1 is maintained in an OFF state. Consequently, in a case where both of analog dimming and digital dimming are performed, even if the first control signal DDRV for digital dimming is inactivated, and thus the transistor QP1 is brought into an OFF state, it is possible to prevent energy accumulated in the inductor L1 from being released without being used for light emission, and thus to reduce a power loss.

In a case where a potential difference between both ends of the light emitting element 110 is less than a predetermined value, the second control signal GATE for analog dimming is activated in at least a partial period, and thus the transistor QN1 is brought into an ON state. Consequently, even in a case where a period in which a current flows through the light emitting element 110 is short in digital dimming, energy can be replenished in the inductor L1, and thus it is possible to prevent a current flowing through the light emitting element 110 from being lower than a current for which an instruction is given in analog dimming.

Seventh Embodiment

Figure 20:
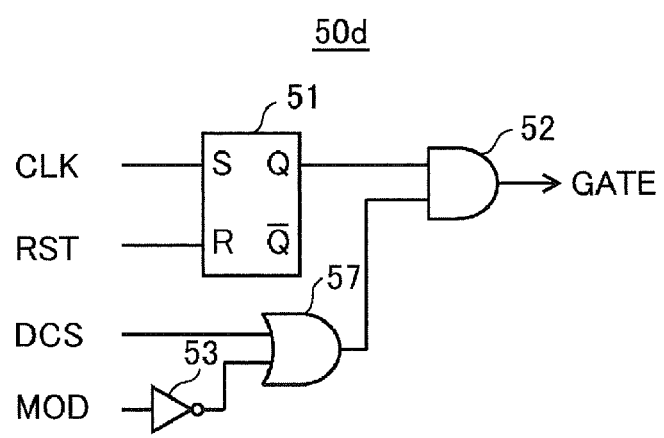
FIG. 20 is a circuit diagram illustrating a configuration example of a switching control circuit in a seventh embodiment.

FIG. 20 is a circuit diagram illustrating a configuration example of a switching control circuit in a seventh embodiment of the invention. In the seventh embodiment, a switching control circuit 50d illustrated in FIG. 20 is used instead of the switching control circuit 50c in the sixth embodiment illustrated in FIG. 17. The seventh embodiment may be the same as the sixth embodiment except for such a configuration.

The light emission control circuit 100 receives information regarding an ON duty ratio of the digital dimming signal DCS, that is, information regarding an ON duty ratio of the first control signal DDRV, from an external microcomputer or the like. Consequently, the switching control circuit 50d may set a condition for activation or inactivation of the second control signal GATE on the basis of the information regarding an ON duty ratio of the first control signal DDRV.

In the example illustrated in FIG. 20, the switching control circuit 50d includes an RS flip-flop 51, an AND circuit 52, an inverter 53, and an OR circuit 57. A mode signal MOD is supplied to the switching control circuit 50d, and the mode signal MOD has a high level in a case where an ON duty ratio of the first control signal DDRV is equal to or more than a predetermined value, and has a low level in a case where an ON duty ratio of the first control signal DDRV is less than the predetermined value.

For example, two types of dimming modes are set according to an ON duty ratio of the first control signal DDRV. In a first dimming mode, an ON duty ratio of the first control signal DDRV is 5% or more and 100% or less, and, in a second dimming mode, an ON duty ratio of the first control signal DDRV is more than 0% and less than 5%. In this case, the mode signal MOD has a high level in the first dimming mode, and has a low level in the second dimming mode.

The RS flip-flop 51 is set in synchronization with rising of the clock signal CLK when the reset signal RST is in a low level, and activates an output signal to a high level, and is reset in synchronization with rising of the reset signal RST when the clock signal CLK is in a low level, and inactivates an output signal to a low level.

The inverter 53 inverts the mode signal MOD so as to generate an output signal. The OR circuit 57 obtains a logical sum between the digital dimming signal DCS and the output signal from the inverter 53, so as to generate an output signal. The AND circuit 52 obtains a logical product between the output signal from the RS flip-flop 51 and the output signal from the OR circuit 57, so as to generate an output signal.

In a case where an ON duty ratio of the first control signal DDRV is equal to or more than a predetermined value, the mode signal MOD has a high level, an output signal from the inverter 53 has a low level, and the OR circuit 57 supplies the digital dimming signal DCS to one input terminal of the AND circuit 52. The AND circuit 52 outputs an output signal from the RS flip-flop 51 as the second control signal GATE in a case where the digital dimming signal DCS is activated to a high level, and inactivates an output signal to a low level in a case where the digital dimming signal DCS is inactivated to a low level.

Therefore, in a case where an ON duty ratio of the first control signal DDRV is equal to or more than a predetermined value, the switching control circuit 50d activates or inactivates the second control signal GATE in order to bring the transistor QN1 into an ON state or an OFF state in a period in which the first control signal DDRV is activated, and maintains the second control signal GATE in an inactivation state in a period in which the first control signal DDRV is inactivated.

On the other hand, in a case where an ON duty ratio of the first control signal DDRV is less than the predetermined value, the mode signal MOD has a low level, an output signal from the inverter 53 has a high level, and the OR circuit 57 supplies a high level signal to one input terminal of the AND circuit 52. The AND circuit 52 outputs an output signal from the RS flip-flop 51 as the second control signal GATE.

Consequently, in a case where an ON duty ratio of the first control signal DDRV is less than the predetermined value, the switching control circuit 50d activates or inactivates the second control signal GATE in asynchronization with the first control signal DDRV. The transistor QN1 is brought into an ON state when the second control signal GATE is activated, and is brought into an OFF state when the second control signal GATE is inactivated.

According to the seventh embodiment, in a case where an ON duty ratio of the first control signal DDRV for digital dimming is equal to or more than a predetermined value, the second control signal GATE for analog dimming is maintained in an inactivation state in a period in which the first control signal DDRV is inactivated, and thus the transistor QN1 is maintained in an OFF state. Consequently, in a case where both of analog dimming and digital dimming are performed, it is possible to prevent energy accumulated in the inductor L1 from being released without being used for light emission, and thus to reduce a power loss.

In a case where an ON duty ratio of the first control signal DDRV for digital dimming is less than the predetermined value, the second control signal GATE for analog dimming is activated or inactivated in asynchronization with the first control signal DDRV, and thus the transistor QN1 is brought into an ON state or an OFF state in asynchronization with the first control signal DDRV. Consequently, even in a case where a period in which a current flows through the light emitting element 110 is short in digital dimming, energy can be replenished in the inductor L1, and thus it is possible to prevent a current flowing through the light emitting element 110 from being lower than a current for which an instruction is given in analog dimming.

Eighth Embodiment

In the above-described light source devices, an N-channel MOS transistor may be used instead of the P-channel MOS transistor QP1 as a first switching element. Hereinafter, as an example, a description will be made of a case where an N-channel MOS transistor is used as a first switching element in the light source device illustrated in FIG. 1.

Figure 21:
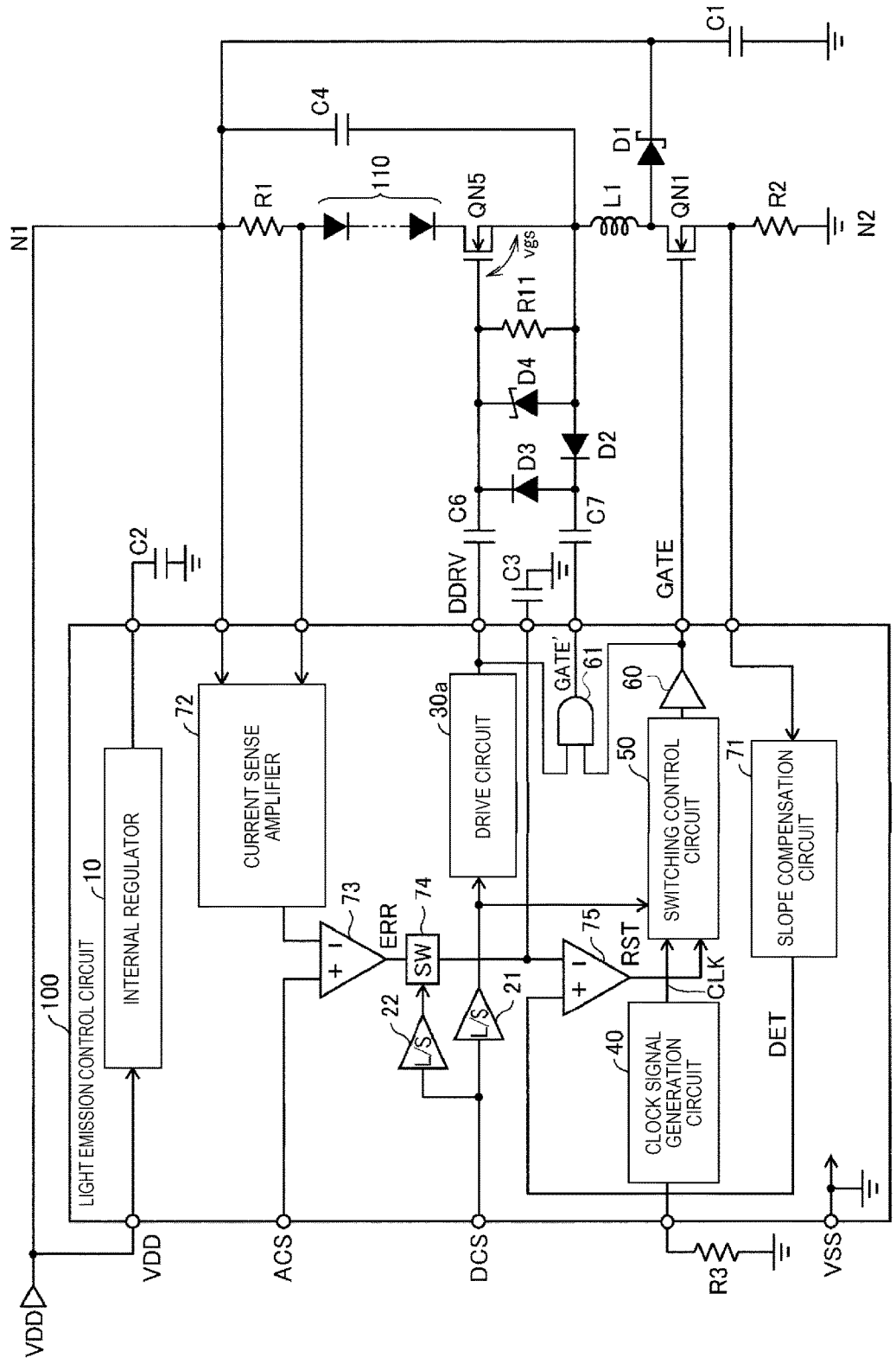
FIG. 21 is a circuit diagram illustrating a light source device including a light emission control circuit according to an eighth embodiment of the invention.

FIG. 21 is a circuit diagram illustrating a configuration example of a light source device including a light emission control circuit according to an eighth embodiment of the invention. As illustrated in FIG. 21, in the light source device, an N-channel MOS transistor QN5 is used as a first switching element, and diodes D2 and D3, a Zener diode D4, a resistor R11, and capacitors C6 and C7 are added.

The transistor QN5 has a drain connected to the light emitting element 110, a source connected to one end of the inductor L1, and a gate to which the first control signal DDRV is applied. A drive circuit 30a activates the first control signal DDRV to a high level in order to bring the transistor QN5 into an ON state, and inactivates the first control signal DDRV to a low level in order to bring the transistor QN5 into an OFF state, according to the digital dimming signal DCS.

Figure 23:
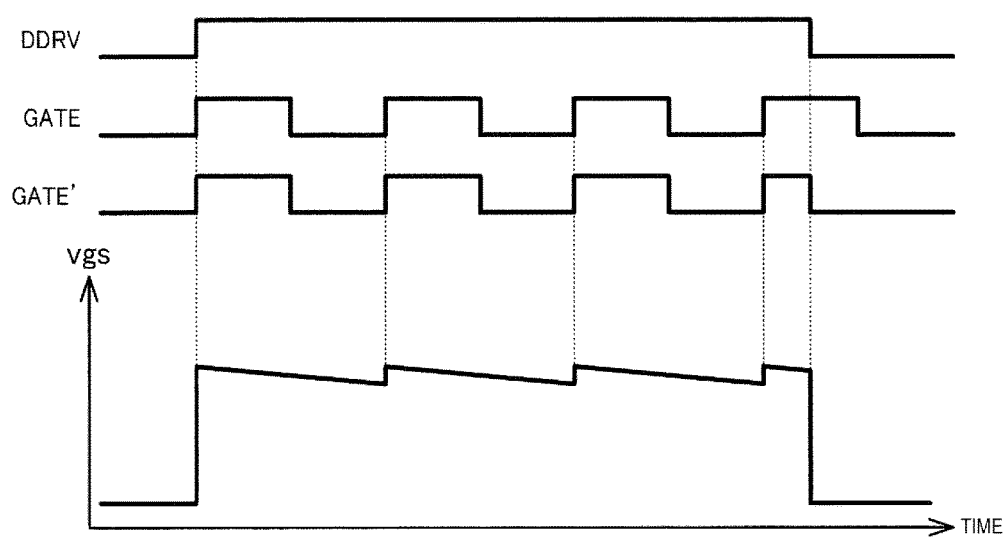
FIG. 23 is a diagram for explaining an operation of the light source device according to the eighth embodiment.
Figure 24:
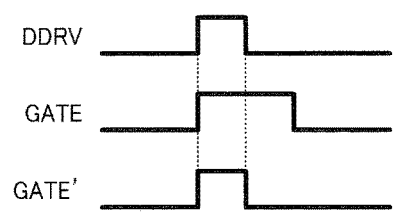
FIG. 24 is a diagram for explaining an operation of the light source device according to the eighth embodiment.

FIGS. 23 and 24 are diagrams for explaining an operation of the light source device illustrated in FIG. 21. As illustrated in FIG. 23, the first control signal DDRV and the second control signal GATE transition between a low level (for example, 0 V) and a high level (for example, 7.5 V). In a case where the first control signal DDRV is activated to a high level, a current flows toward the gate of the transistor QN5 from the drive circuit 30a via the capacitor C6, so that a gate-source voltage of the transistor QN5 increases, and thus the transistor QN5 is brought into an ON state. The Zener diode D4 clamps the gate-source voltage of the transistor QN5 not to exceed a predetermined voltage (for example, 7.5 V).

As illustrated in FIG. 21, the resistor R11 is provided between the gate and the source of the transistor QN5. The reason of providing the resistor R11 will be described later. As illustrated in FIG. 23, when the first control signal DDRV transitions from a low level to a high level, the gate-source voltage of the transistor QN5 increases. In digital dimming, in a case where a duty ratio of the first control signal DDRV is high, a period increases in which the first control signal DDRV has a high level. Taking into consideration, the gate-source voltage of the transistor QN5 gradually decreases due to the resistor R11. A third control signal GATE' is used to maintain the gate-source voltage of the transistor QN5. In other words, as illustrated in FIG. 23, the third control signal GATE' transitions between a low level and a high level in a period in which the first control signal DDRV is maintained in an activation state. Consequently, the capacitor C7 and the diodes D2 and D3 perform a rectification operation, and thus the gate-source voltage of the transistor QN5 is maintained to be equal to or higher than a threshold voltage. In other words, the capacitor C7 is provided between an output terminal for the third control signal GATE' and an anode terminal of the diode D3. When the third control signal GATE' has a low level, the anode terminal of the diode D3 substantially has a source voltage of the transistor QN5 due to the diode D2. When the third control signal GATE' transitions from a low level to a high level, a voltage of the anode terminal of the diode D3 increases. Consequently, a voltage of the gate of the transistor QN5 connected to a cathode terminal of the diode D3 increases. In the above-described way, the gate-source voltage of the transistor QN5 can be maintained by the third control signal GATE' in a period in which the first control signal DDRV has a high level.

In a case where the first control signal DDRV is inactivated to a low level, a current flows from the source of the transistor QN5 toward the drive circuit 30a via the diodes D2 and D3 and the capacitor C6, so that the gate-source voltage of the transistor QN5 decreases, and thus the transistor QN5 is brought into an OFF state. In a case where a light emitting device stops light emission for a long time during standby or the like, the resistor R11 reduces a gate-source voltage of the transistor QN5, and thus maintains the transistor QN5 in an OFF state.

As illustrated in FIG. 23, when the first control signal DDRV transitions from a high level to a low level, in a case where the third control signal GATE' has a high level, the third control signal GATE' transitions to a low level. The third control signal GATE' has a low level in a period in which the first control signal DDRV has a low level. In a case where the third control signal GATE' has a high level when the first control signal DDRV has a low level, there is a probability that the transistor QN5 may be turned on by the capacitor C7 and the diode D3. Thus, when the first control signal DDRV transitions from a high level to a low level, the third control signal GATE' transitions to a low level.

As illustrated in FIG. 24, in digital dimming, in a case where a duty ratio of the first control signal DDRV is low, a period is short in which the first control signal DDRV has a high level. In this case, assuming that the transistor QN1 is turned off at a timing at which the transistor QN5 is turned off, the transistor QN1 is turned on in only a period in which the first control signal DDRV has a high level. Since energy is accumulated in the inductor L1 when the transistor QN1 is turned on, in a case where an ON period of the transistor QN1 is short, energy is hardly accumulated in the inductor L1. In other words, in a case where a duty ratio of the first control signal DDRV is low, there is concern that brightness caused by light emission of the light emitting element 110 may be more insufficient than expected in digital dimming.

Thus, as illustrated in FIG. 24, the second control signal GATE transitions from a high level to a low level after the first control signal DDRV transitions from a high level to a low level, and then a predetermined period elapses. Consequently, since an ON period of the transistor QN1 is extended, the light emitting element 110 can be caused to emit light with appropriate brightness in digital dimming even in a case where a duty ratio of the first control signal DDRV is low. As described above, when the first control signal DDRV transitions from a high level to a low level, the third control signal GATE' transitions to a low level. In other words, the third control signal GATE' is a signal different from the second control signal GATE.

As illustrated in FIG. 21, the light emission control circuit 100 includes an output circuit 61 which outputs the third control signal GATE'. For example, the output circuit 61 is an AND circuit. The AND circuit obtains a logical product between the first control signal DDRV and the second control signal GATE, and outputs a result thereof as the third control signal GATE'. The output circuit 61 may be included in the switching control circuit 50. The output circuit 61 may output the third control signal GATE' on the basis of the first control signal DDRV and an output signal from the switching control circuit 50. The output signal from the switching control circuit 50 is a signal which is output to the drive circuit 60 from the switching control circuit 50. The output circuit 61 may output the third control signal GATE' on the basis of the digital dimming signal DCS and the second control signal GATE, or on the basis of the digital dimming signal DCS and an output signal from the switching control circuit 50.

In a case where the second control signal GATE may be maintained in an inactivation state in an inactivation period of the first control signal DDRV, the second control signal GATE may be used as the third control signal GATE'.

In the sixth embodiment illustrated in FIG. 17, the second control signal GATE may be activated and inactivated even in an inactivation period of the first control signal DDRV, and thus the third control signal GATE' different from the second control signal GATE is used. For example, an AND circuit which obtains a logical product between the digital dimming signal DCS or the first control signal DDRV and the second control signal GATE is provided in the switching control circuit 50, and thus the third control signal GATE' is generated.

According to the above-described embodiments, the light emission control circuit 100 can prevent energy accumulated in the inductor L1 from being released without being used for light emission, and can also prevent a reduction in a current flowing through the light emitting element 110 even in a case where a period is short in which a current flows through the light emitting element 110 in digital dimming, so that it is possible to provide a light source device which is low in power loss and can accurately control brightness. The light emission control circuit 100 may receive the first control signal DDRV, and the second control signal GATE which is adjusted according to an ON duty ratio of the first control signal DDRV from an external microcomputer or the like, so as to perform light emission control.

Projection Type Video Display Apparatus

Figure 22:
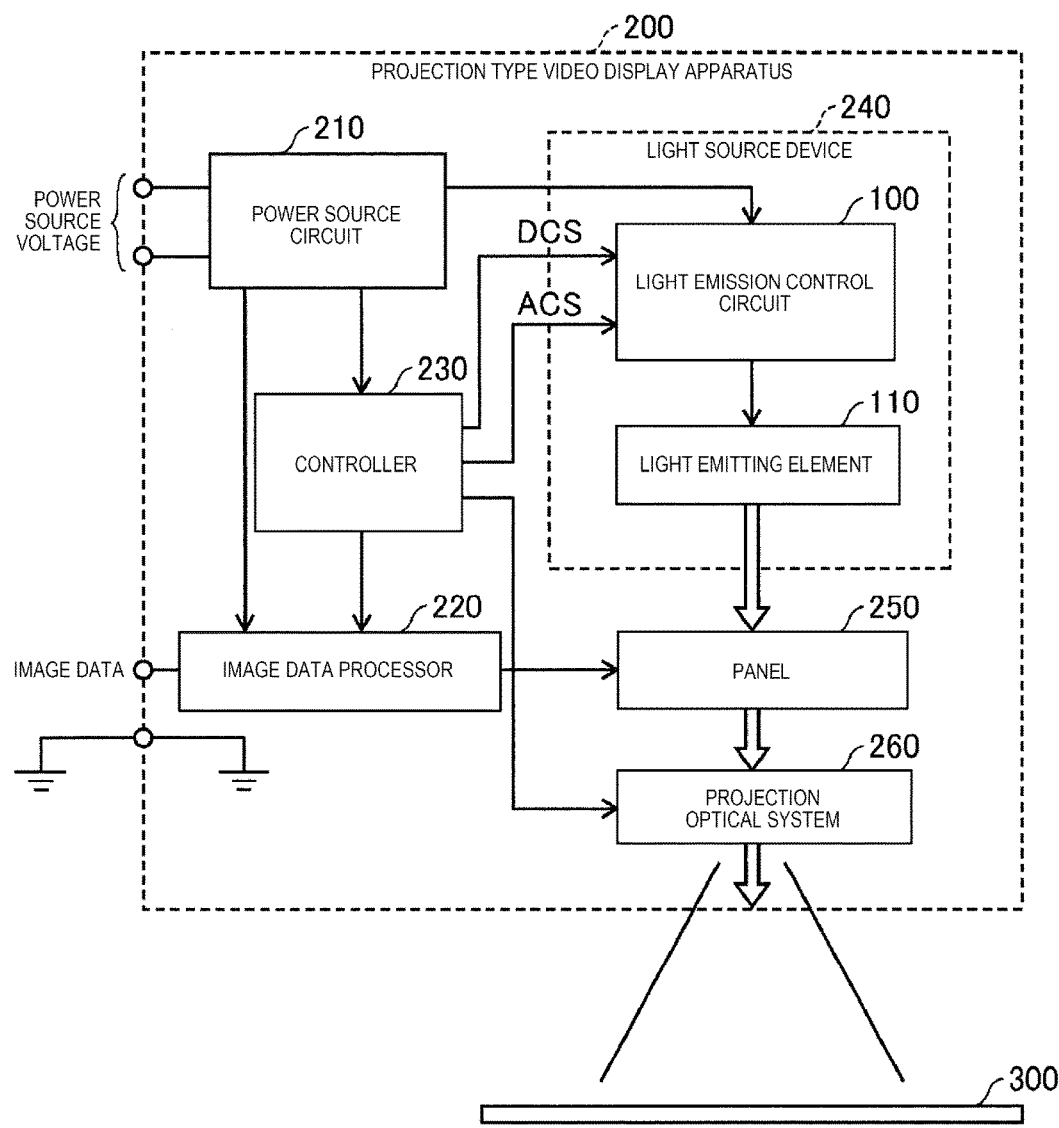
FIG. 22 is a block diagram illustrating a configuration example of a projection type video display apparatus according to an embodiment of the invention.

Next, a projection type video display apparatus (video projector) according to an embodiment of the invention will be described. FIG. 22 is a block diagram illustrating a configuration example of a projection type video display apparatus according to an embodiment of the invention. A projection type video display apparatus 200 is a display apparatus which is supplied with a power source voltage from the outside, receives image data from an image data supply apparatus such as a personal computer or a video player, and projects an image onto a screen (projection surface) 300 on the basis of the image data.

As illustrated in FIG. 22, the projection type video display apparatus 200 includes a power source circuit 210, an image data processor 220, a controller 230, a light source device 240, a panel 250, and a projection optical system 260. The light source device 240 includes the light emission control circuit 100 and the light emitting element 110.

The power source circuit 210 generates a logical power source voltage on the basis of a power source voltage of AC 100 V supplied from the outside, supplies the logical power source voltage to the image data processor 220, the controller 230, and the like, generates a power source voltage of about DC 50 V, and supplies the power source voltage to the light emission control circuit 100 of the light source device 240, and the like. The light emission control circuit 100 generates an internal power source voltage of about DC 30 V to 40 V on the basis of, for example, a power source voltage of about DC 50 V.

Each of the image data processor 220 and the controller 230 is configured with, for example, a single or a plurality of microcomputers. The image data processor 220 processes image data supplied from the outside so as to generate a display image signal and a synchronization signal, and supplies the image signal and the synchronization signal to the panel 250 such that the panel 250 is driven to perform drawing.

The controller 230 controls each portion of the projection type video display apparatus 200 according to an operation performed by an operator by using a remote controller or an operation panel (not illustrated). In a case where the operator gives an instruction for dimming, the controller 230 generates the digital dimming signal DCS and the analog dimming signal ACS for performing the dimming for which an instruction is given by the operator, and supplies the signals to the light emission control circuit 100 of the light source device 240.

The light source device 240 emits light with brightness according to the digital dimming signal DCS and the analog dimming signal ACS supplied from the controller 230, and irradiates the panel 250 with light. For example, in a case where the light emitting element 110 includes a plurality of laser diodes emitting blue light, the light source device 240 may further include a phosphor which receives blue light generated by some of the laser diodes and generates yellow light, and a spectrometer which separates yellow light into red light and green light according to a wavelength. In this case, the light source device 240 can generate light of three colors such as red (R), green (G), and blue (B).

The panel 250 modulates light applied from the light source device 240 according to the image signal and the synchronization signal supplied from the image data processor 220. For example, the panel 250 may include three liquid crystal panels corresponding to three colors such as RGB. Each liquid crystal panel forms an image by changing transmittance of light in a plurality of pixels arranged in a matrix form. Modulated light which is modulated by the panel 250 is guided to the projection optical system 260.

The projection optical system 260 includes at least one lens. For example, the projection optical system 260 is provided with projection lenses which are a lens group for projecting the modulated light modulated by the panel 250 onto the screen 300 in order to form an image, and various mechanisms which change diaphragm states, zoom states, shift positions, or the like of the projection lenses. The mechanisms are controlled by the controller 230. The projection optical system 260 projects the modulated light onto the screen 300, and thus an image is displayed on the screen 300. According to the present embodiment, it is possible to reduce power consumption of the projection type video display apparatus and to accurately control luminance of a projected image by using the light source device 240 which is small in power loss and can accurately control brightness.

The invention is not limited to the above-described embodiments, and may be variously modified within the technical scope of the invention by a person skilled in the art. For example, the invention may be realized by combining a plurality of embodiments selected from among the above-described embodiments with each other.

What is claimed is:

1. A light emission control circuit that controls a first switching element controlling a current flowing through a light emitting element connected between a first node and one end of an inductor and a second switching element controlling a current flowing from the other end of the inductor toward a second node, the light emission control circuit comprising:
    a drive circuit that activates or inactivates a first control signal in order to bring the first switching element into an ON state or an OFF state respectively; and
    a switching control circuit that brings the second switching element into an ON state or an OFF state by respectively activating or inactivating a second control signal in a period in which the first control signal is activated,
    wherein the switching control circuit
    maintains the second control signal in an inactivation state in a period in which the first control signal is inactivated when an ON duty ratio of the first control signal is equal to or more than a predetermined value, and
    maintains the second control signal in an activation state in a part of the period in which the first control signal is inactivated when the ON duty ratio of the first control signal is less than the predetermined value.

2. The light emission control circuit according to claim 1, wherein the switching control circuit maintains the second control signal in an activation state for a predetermined period after the first control signal transitions from an activation state to an inactivation state when the ON duty ratio of the first control signal is less than the predetermined value.

3. The light emission control circuit according to claim 2, wherein, when the ON duty ratio of the first control signal is less than the predetermined value, and the second control signal is not inactivated during a period before the first control signal transitions from an activation state to an inactivation state, the switching control circuit maintains the second control signal in an activation state in the predetermined period.

4. The light emission control circuit according to claim 2, wherein the switching control circuit sets the predetermined period to a first period when the ON duty ratio of the first control signal is a first value, and sets the predetermined period to a second period longer than the first period when the ON duty ratio of the first control signal is a second value smaller than the first value.

5. The light emission control circuit according to claim 2, wherein the switching control circuit adjusts a length of the predetermined period based on a current flowing through the light emitting element.

6. The light emission control circuit according to claim 1, wherein, when the ON duty ratio of the first control signal is less than the predetermined value, the switching control circuit:
    extends, by a first period, a period in which the second control signal is maintained in an activation state after the first control signal transitions from an activation state to an inactivation state when a current flowing through the light emitting element is less than the predetermined value when the first control signal is activated, and reduces, by a second period, the period in which the second control signal is maintained in an activation state after the first control signal transitions from an activation state to an inactivation state when a current flowing through the light emitting element is more than the predetermined value when the first control signal is activated.

7. The light emission control circuit according to claim 6, wherein the second period is longer than the first period.

8. The light emission control circuit according to claim 1, wherein information regarding the ON duty ratio of the first control signal is received from outside of the light emission control circuit.

9. A light emission control circuit that controls a first switching element controlling a current flowing through a light emitting element connected between a first node and one end of an inductor and a second switching element controlling a current flowing from the other end of the inductor toward a second node, the light emission control circuit comprising:

a drive circuit that activates or inactivates a first control signal in order to bring the first switching element into an ON state or an OFF state respectively; and a switching control circuit that:
activates or inactivates a second control signal in order to bring the second switching element into a respective ON state or an OFF state in a period in which the first control signal is activated, reduces a period in which activation of the second control signal is prohibited within a period in which the first control signal is inactivated when a current flowing through the light emitting element is less than a predetermined value when the first control signal is activated, and extends the period in which activation of the second control signal is prohibited within the period in which the first control signal is inactivated when the current flowing through the light emitting element is more than the predetermined value when the first control signal is activated.

10. The light emission control circuit according to claim 5, further comprising:

a sample-hold circuit that samples and holds a voltage which is proportional to a current flowing through the light emitting element when the first control signal is activated.

11. A light source device comprising:
the light emission control circuit according to claim 1;
the light emitting element;
the inductor;
the first switching element;
the second switching element;
a capacitor connected between one end of the inductor and the first node; and
a diode connected between the other end of the inductor and the first node,
wherein,
when the first and second switching elements are in an ON state, current flows through the light emitting element and the inductor such that energy is accumulated in the inductor;
when the first switching element is in an ON state, and the second switching element is in an OFF state, current flows through the light emitting element and the diode due to the energy accumulated in the inductor; and
when the first switching element is in an OFF state, and the second switching element is in an ON state, current flows through the capacitor and the inductor such that energy is accumulated in the inductor.

12. A projection type video display apparatus comprising the light source device according to claim 11.

13. A light emission control circuit to control a first switching element that switches current to a light emitting element connected between a first node and one end of an inductor and a second switching element that switches current from an other end of the inductor toward a second node, the light emission control circuit comprising:

a drive circuit that selectively outputs a first control signal according to an ON duty ratio to switch ON the first switching element; and a switching control circuit that:
selectively outputs a second control signal to switch ON the second switching element when the drive circuit is outputting the first control signal;

ceases output of the second control signal and does not output the second control signal during a period in which the drive circuit is not outputting the first control signal and the ON duty ratio is greater than or equal to a predetermined value; and outputs the second control signal for at least a portion of the period in which the drive circuit is not outputting the first control signal and the ON duty ratio is less than the predetermined value.

* * * * *